United States Patent
Coleman et al.

(10) Patent No.: US 9,307,884 B1
(45) Date of Patent: Apr. 12, 2016

(54) VISUAL ASSET STRUCTURING TOOL

(75) Inventors: Don Coleman, Weatherby Lake, MO (US); Jeff Dodson, Independence, MO (US); Noel F. Fouts, Arlington, TX (US); Michael I. Matheson, Grapevine, TX (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 1635 days.

(21) Appl. No.: 10/351,958

(22) Filed: Jan. 27, 2003

(51) Int. Cl.
*G06Q 40/00* (2012.01)
*A47L 13/502* (2006.01)

(52) U.S. Cl.
CPC .............. *A47L 13/502* (2013.01); *G06Q 40/00* (2013.01)

(58) Field of Classification Search
None
See application file for complete search history.

(56) References Cited

U.S. PATENT DOCUMENTS

| | | | |
|---|---|---|---|
| 4,736,294 A | 4/1988 | Gill et al. | |
| 4,774,664 A * | 9/1988 | Campbell | G06Q 20/40 700/90 |
| 4,800,504 A * | 1/1989 | Durst, Jr. | B07C 3/00 235/375 |
| 4,876,648 A * | 10/1989 | Lloyd | G06Q 40/00 700/90 |
| 4,914,587 A | 4/1990 | Clouse | |
| 5,058,009 A * | 10/1991 | Yoshino | G06Q 40/00 705/35 |
| 5,220,500 A * | 6/1993 | Baird | G06Q 40/06 705/36 R |
| 5,241,466 A | 8/1993 | Perry et al. | |
| 5,283,829 A | 2/1994 | Anderson | |
| 5,323,315 A | 6/1994 | Highbloom | |
| 5,383,113 A | 1/1995 | Kight et al. | |
| 5,465,206 A | 11/1995 | Hilt et al. | |
| 5,483,445 A | 1/1996 | Pickering | |
| 5,544,255 A | 8/1996 | Smithies et al. | |
| 5,550,971 A | 8/1996 | Brunner et al. | |
| 5,550,976 A * | 8/1996 | Henderson | G06F 17/30607 707/999.01 |
| 5,557,515 A | 9/1996 | Abbruzzese et al. | |
| 5,563,783 A | 10/1996 | Stolfo et al. | |
| 5,615,268 A | 3/1997 | Bisbee et al. | |
| 5,629,981 A | 5/1997 | Nerlikar | |
| 5,630,127 A | 5/1997 | Moore et al. | |
| 5,649,116 A | 7/1997 | McCoy et al. | |
| 5,649,117 A | 7/1997 | Landry | |
| 5,673,402 A | 9/1997 | Ryan et al. | |
| 5,696,907 A | 12/1997 | Tom | |
| 5,699,528 A | 12/1997 | Hogan | |
| 5,704,045 A | 12/1997 | King et al. | |
| 5,712,960 A * | 1/1998 | Chiopris et al. | 706/61 |
| 5,724,577 A | 3/1998 | Exley et al. | |
| 5,734,890 A | 3/1998 | Case et al. | |
| 5,761,441 A | 6/1998 | Bennett | |
| 5,765,144 A | 6/1998 | Larche et al. | |
| 5,774,883 A | 6/1998 | Andersen et al. | |
| 5,787,443 A | 7/1998 | Palmer | |

(Continued)

OTHER PUBLICATIONS

Legacy Family Tree Genealogy Software: Features, Legacy 4.0 Family Tree, available at www.legacyfamilytree.com/Features.asp (accessed Aug. 2002).

(Continued)

*Primary Examiner* — Gregory Johnson
(74) *Attorney, Agent, or Firm* — Buchanan Ingersoll & Rooney PC; Robert J. Pugh

(57) ABSTRACT

Systems and techniques for graphically representing a commercial deal by defining entities, assigning roles for relating entities, accessing commercial deal information corresponding to the entities, defining objects for related entities, and automatically generating a visual representation depicting a relationship between entities involved in a commercial deal.

21 Claims, 13 Drawing Sheets

(56) References Cited

U.S. PATENT DOCUMENTS

| | | |
|---|---|---|
| 5,790,260 A | 8/1998 | Myers |
| 5,812,134 A * | 9/1998 | Pooser et al. ............... 715/848 |
| 5,813,009 A | 9/1998 | Johnson et al. |
| 5,832,460 A | 11/1998 | Bednar et al. |
| 5,839,118 A | 11/1998 | Ryan et al. |
| 5,862,325 A * | 1/1999 | Reed .................. H04L 29/06 704/270.1 |
| 5,870,721 A | 2/1999 | Norris |
| 5,875,431 A | 2/1999 | Heckman et al. |
| 5,875,437 A | 2/1999 | Atkins |
| 5,884,288 A | 3/1999 | Chang et al. |
| 5,893,079 A | 4/1999 | Cwenar |
| 5,930,759 A | 7/1999 | Moore et al. |
| 5,930,764 A | 7/1999 | Melchione et al. |
| 5,930,778 A | 7/1999 | Geer |
| 5,943,656 A | 8/1999 | Crooks et al. |
| 5,956,691 A * | 9/1999 | Powers .................. G06Q 40/06 705/4 |
| 5,956,700 A | 9/1999 | Landry |
| 5,963,925 A | 10/1999 | Kolling et al. |
| 5,966,441 A * | 10/1999 | Calamera ............ H04L 63/0428 713/167 |
| 5,966,700 A | 10/1999 | Gould et al. |
| 5,970,476 A * | 10/1999 | Fahey .................. G06Q 10/04 705/28 |
| 5,978,780 A | 11/1999 | Watson |
| 5,983,206 A | 11/1999 | Oppenheimer |
| 5,987,434 A | 11/1999 | Libman |
| 5,991,750 A | 11/1999 | Watson |
| 5,991,881 A | 11/1999 | Conklin et al. |
| 5,995,947 A | 11/1999 | Fraser et al. |
| 6,012,047 A | 1/2000 | Mazonas |
| 6,016,482 A | 1/2000 | Molinari |
| 6,018,721 A | 1/2000 | Aziz et al. |
| 6,018,723 A | 1/2000 | Siegel et al. |
| 6,021,202 A | 2/2000 | Anderson et al. |
| 6,023,692 A * | 2/2000 | Nichols ................. G09B 7/04 706/14 |
| 6,029,887 A | 2/2000 | Furuhashi et al. |
| 6,032,133 A | 2/2000 | Hilt et al. |
| 6,035,285 A | 3/2000 | Schlect et al. |
| 6,043,819 A | 3/2000 | LeBrun et al. |
| 6,044,362 A | 3/2000 | Neely |
| 6,049,782 A | 4/2000 | Gottesman et al. |
| 6,055,505 A | 4/2000 | Elston |
| 6,061,515 A * | 5/2000 | Chang ............... G06F 17/30607 707/999.1 |
| 6,070,150 A | 5/2000 | Remington et al. |
| 6,070,151 A | 5/2000 | Frankel |
| 6,076,072 A | 6/2000 | Libman |
| 6,078,905 A | 6/2000 | Pich-LeWinter |
| 6,078,907 A | 6/2000 | Lamm |
| 6,081,790 A | 6/2000 | Rosen |
| 6,091,893 A * | 7/2000 | Fintel .................. G06F 8/34 703/6 |
| 6,105,007 A | 8/2000 | Norris |
| 6,119,103 A | 9/2000 | Basch et al. |
| 6,119,104 A | 9/2000 | Brumbelow et al. |
| 6,119,107 A | 9/2000 | Polk |
| 6,128,599 A | 10/2000 | Walker et al. |
| 6,128,603 A | 10/2000 | Dent et al. |
| 6,131,810 A | 10/2000 | Weiss et al. |
| 6,138,102 A | 10/2000 | Hinckley, Jr. |
| 6,138,130 A * | 10/2000 | Adler .................. G06F 17/246 715/209 |
| 6,148,293 A | 11/2000 | King |
| 6,161,098 A | 12/2000 | Wallman |
| 6,182,048 B1 | 1/2001 | Osborn et al. |
| 6,185,683 B1 | 2/2001 | Ginter et al. |
| 6,202,053 B1 | 3/2001 | Christiansen et al. |
| 6,205,434 B1 | 3/2001 | Ryan et al. |
| 6,209,095 B1 | 3/2001 | Anderson et al. |
| 6,223,983 B1 | 5/2001 | Kjonaas et al. |
| 6,226,623 B1 | 5/2001 | Schein |
| 6,226,624 B1 | 5/2001 | Waton et al. |
| 6,233,566 B1 * | 5/2001 | Levine .................. G06Q 40/02 705/36 R |
| 6,237,096 B1 | 5/2001 | Bisbee et al. |
| 6,249,775 B1 | 6/2001 | Freeman |
| 6,266,054 B1 | 7/2001 | Lawton et al. |
| 6,266,666 B1 | 7/2001 | Ireland et al. |
| 6,270,457 B1 | 8/2001 | Bardy |
| 6,275,824 B1 | 8/2001 | O'Flaherty |
| 6,279,008 B1 | 8/2001 | Ng et al. |
| 6,292,788 B1 | 9/2001 | Roberts |
| 6,301,579 B1 * | 10/2001 | Becker ............... G06F 17/30592 |
| 6,324,541 B1 | 11/2001 | de l'Etraz et al. |
| 6,344,855 B1 * | 2/2002 | Fisher .................. G06F 9/52 345/501 |
| 6,345,262 B1 | 2/2002 | Madden |
| 6,366,294 B1 * | 4/2002 | Cunningham ............ G06T 3/40 345/666 |
| 6,367,013 B1 | 4/2002 | Bisbee et al. |
| 6,389,588 B1 | 5/2002 | Wadhwa |
| 6,401,079 B1 * | 6/2002 | Kahn .................. G06Q 20/102 705/30 |
| 6,401,085 B1 * | 6/2002 | Gershman ......... G06F 17/30867 |
| 6,460,021 B1 | 10/2002 | Kirksey |
| 6,549,880 B1 * | 4/2003 | Willoughby ............... H02J 3/00 700/22 |
| 6,584,501 B1 * | 6/2003 | Cartsonis ............ H04L 12/2602 370/233 |
| 6,589,721 B1 * | 7/2003 | Arcus ...................... G03C 7/30 430/435 |
| 6,614,452 B1 * | 9/2003 | Cable .................. A61B 5/0059 382/280 |
| 6,615,187 B1 | 9/2003 | Ashenmil et al. |
| 6,868,525 B1 * | 3/2005 | Szabo ........................ 715/854 |
| 6,901,554 B1 * | 5/2005 | Bahrs ...................... G06F 8/38 715/209 |
| 6,904,412 B1 * | 6/2005 | Broadbent ............ G06Q 10/10 705/38 |
| 6,957,191 B1 * | 10/2005 | Belcsak ............... G06Q 20/10 705/38 |
| 6,970,844 B1 * | 11/2005 | Bierenbaum .......... G06Q 10/00 705/1.1 |
| 6,988,249 B1 * | 1/2006 | Arvanitis ............... G06Q 40/04 715/853 |
| 7,020,631 B2 * | 3/2006 | Freeman ............... G06Q 20/102 705/35 |
| 7,020,697 B1 * | 3/2006 | Goodman ............... G06Q 10/10 709/223 |
| 7,035,820 B2 * | 4/2006 | Goodwin et al. ............... 705/35 |
| 7,089,503 B1 * | 8/2006 | Bloomquist ......... G06Q 40/025 705/38 |
| 7,107,239 B2 | 9/2006 | Graff |
| 7,181,422 B1 | 2/2007 | Philip et al. |
| 7,246,128 B2 * | 7/2007 | Jordahl ............ G06F 17/30601 |
| 7,305,392 B1 * | 12/2007 | Abrams ................. G06Q 10/06 707/770 |
| 7,308,388 B2 * | 12/2007 | Beverina ............ G06Q 20/203 703/2 |
| 7,313,540 B1 | 12/2007 | Hueler et al. |
| 7,315,841 B1 | 1/2008 | McDonald et al. |
| 7,337,136 B1 * | 2/2008 | Burns .................. G06Q 40/025 705/36 R |
| 7,340,427 B1 | 3/2008 | Cornell |
| 7,386,507 B2 | 6/2008 | Davis et al. |
| 7,415,471 B1 | 8/2008 | Coleman |
| 7,443,401 B2 * | 10/2008 | Blanco .................... G06T 13/00 345/473 |
| 7,447,659 B2 | 11/2008 | Parthasarthy |
| 7,469,227 B2 * | 12/2008 | Breeden ................. G06Q 40/00 705/35 |
| 7,523,066 B2 * | 4/2009 | Beggins .................. G06Q 30/02 705/35 |
| 7,590,617 B1 * | 9/2009 | Voigt .................. G06F 19/3406 |
| 7,599,879 B2 * | 10/2009 | Louie .................. G06Q 40/00 705/36 R |
| 7,720,698 B1 * | 5/2010 | Gulko .................. G06Q 10/087 705/30 |
| 7,742,966 B2 * | 6/2010 | Erlanger ............. G06Q 30/0207 705/1.1 |
| 7,783,562 B1 | 8/2010 | Ellis |

(56) References Cited

U.S. PATENT DOCUMENTS

| | | | |
|---|---|---|---|
| 7,801,782 B2* | 9/2010 | DeAddio | G06Q 20/10 705/35 |
| 7,860,781 B1* | 12/2010 | Bodi | G06Q 40/00 705/35 |
| 8,015,091 B1* | 9/2011 | Ellis | G06Q 40/00 705/35 |
| 2001/0032084 A1* | 10/2001 | Day | G06F 17/30017 704/270.1 |
| 2001/0034701 A1* | 10/2001 | Fox | G06Q 40/02 705/38 |
| 2001/0037287 A1 | 11/2001 | Broadbent et al. | |
| 2001/0047326 A1 | 11/2001 | Broadbent et al. | |
| 2001/0054022 A1* | 12/2001 | Louie | G06Q 40/00 705/38 |
| 2001/0056397 A1* | 12/2001 | Kelly | G06Q 40/02 705/38 |
| 2002/0019804 A1 | 2/2002 | Sutton | |
| 2002/0029207 A1 | 3/2002 | Bakalash et al. | |
| 2002/0038285 A1 | 3/2002 | Golden et al. | |
| 2002/0046158 A1* | 4/2002 | Kelly | G06Q 40/025 705/38 |
| 2002/0055905 A1 | 5/2002 | Jannah et al. | |
| 2002/0138590 A1* | 9/2002 | Beams | G09B 7/00 709/218 |
| 2002/0178433 A1* | 11/2002 | Hodgson | G06Q 10/10 717/105 |
| 2002/0188497 A1* | 12/2002 | Cerwin | G06Q 30/0205 705/7.34 |
| 2002/0188556 A1* | 12/2002 | Colica et al. | 705/38 |
| 2003/0018558 A1 | 1/2003 | Heffner et al. | |
| 2003/0018563 A1 | 1/2003 | Kilgour et al. | |
| 2003/0050884 A1 | 3/2003 | Barnett | |
| 2003/0058277 A1* | 3/2003 | Bowman-Amuah | G06F 17/30607 715/765 |
| 2003/0076329 A1* | 4/2003 | Beda | G06T 15/00 345/557 |
| 2003/0083957 A1* | 5/2003 | Olefson | G06Q 30/0643 705/27.2 |
| 2003/0084015 A1* | 5/2003 | Beams | G09B 5/14 706/47 |
| 2003/0110073 A1* | 6/2003 | Briel | G06Q 30/06 705/27.1 |
| 2003/0110464 A1* | 6/2003 | Davidson | G06F 17/5045 716/117 |
| 2003/0126293 A1* | 7/2003 | Bushey | G06F 17/30905 709/246 |
| 2003/0135451 A1 | 7/2003 | O'Brien et al. | |
| 2003/0144949 A1* | 7/2003 | Blanch | G06Q 30/06 705/38 |
| 2003/0193517 A1* | 10/2003 | Cable | A61B 5/0059 715/716 |
| 2003/0220870 A1* | 11/2003 | Bayrooti | G06Q 20/10 705/39 |
| 2004/0019558 A1 | 1/2004 | McDonald et al. | |
| 2004/0041812 A1* | 3/2004 | Roberts | G06F 17/5004 345/474 |
| 2004/0090472 A1* | 5/2004 | Risch et al. | 345/853 |
| 2004/0130550 A1* | 7/2004 | Blanco | G06T 13/00 345/473 |
| 2005/0010504 A1* | 1/2005 | Gebhard et al. | 705/34 |
| 2005/0102225 A1 | 5/2005 | Oppenheimer et al. | |
| 2006/0095457 A1* | 5/2006 | Glasspool | G06Q 10/10 |
| 2007/0067229 A1 | 3/2007 | Parthasarathy | |
| 2009/0221369 A1* | 9/2009 | Riopelle | G10H 1/00 463/35 |

OTHER PUBLICATIONS

Legacy Family Tree Genealogy Software: Legacy Guided Tour, available at www.legacyfamilytree.com/Tour.asp (accessed Aug. 2002).

Legacy Family Tree Genealogy Software: Tour Information Window, available at www.legacyfamilytree.com/TourInformation.asp (accessed Aug. 2002).

Legacy Family Tree Genealogy Software: Tour GEDCOM Import, available at www.legacyfamilytree.com/TourImport.asp (accessed Aug. 2002).

Reditus: Options Design & Pricing Platform, available at www.cmis.csiro.au/reditus/ (accessed Aug. 2002).

Reditus: An Innovative Tool for Developing/Researching New Products, available at www.cmis.csiro.au/reditus/Presentation/Reditus_General.doc (accessed Aug. 2002).

Reditus: A Manufacture & Trade Tool for New Financial Instruments, available at www.cmis.csiro.au/reditus/Presentation/ReditusGeneral.ppt (accessed Aug. 2002).

Reditus: Monte-Carlo Engine, available at www.cmis.csiro.au/reditus/ModelDocuments/Reditus_brochure3.doc (accessed Aug. 2002).

How to Set up a Simple Model From Scratch in *Reditus* (May 2001), available at www.cmls.csiro.au/reditus/ModelDocuments/StepByStepExample.doc (accessed Aug. 2002).

Business Valuation and Deal Structure Software, Business ValueXpress, available at www.businessvaluexpress.com/seamless.asp (accessed Aug. 2002).

Humanconcepts, LLC, The Industry Standard in Organization Charting, available at http://www.orgplus.com/ (accessed Aug. 2002).

OrgPlus 4.0 Professional QuickStart Guide 2002, available at www.humanconcepts.com (accessed Aug. 2002).

OrgPlus Quicktour, available at www.humanconcepts.com (accessed Aug. 2002).

"Loan Securitization," printed from http://www.mortgage-investments.com/Investment_in_mortgages/loan_securitization.htm, Internet site, accessed on Oct. 17, 2001, 1 page.

"A Simplified Example of Small Business Loan Securitization," printed from http://minneapolisfed.org/pubs/region/95-09/reg959-1.html, Internet site, accessed on Oct. 17, 2001, 1 page.

"Defining Business Rules ~ What Are They Really?" http://businessrulesgroup.org/first_paper/, Mar. 4, 2001. Date taken from www.archive.org. Archive page attached.

Search Report on word mark "Enterprise" obtained from Trademark Electronic Search System (TESS), http://tess.uspto.gov, filed Jul. 12, 2000.

Brochure "Zenetics company & product information," Apr. 2001.

Website "Business Rules and Mortgage Banking," http://www.astera.com/CentMortgWP.html, accessed on Sep. 10, 2002.

"Business Rules Primer," obtained from http://www.astera.com accessed on Mar. 2000.

"Enterprise Loan Management System" (CD-ROM) Dec. 2001.

Inventorying. (n.d.). The American Heritage® Dictionary of the English Language, Fourth Edition. Retrieved Jun. 12, 2007, from Dictionary.com website: http://dictionary.reference.com/browse/inventorying.

Enterprise! Loan Management System, Version 3.3, CMBS Reporting Module—Product Summary, Updated December Midland Loan Services, 2001.

Enterprise! Loan Management System, Version 3.3 Core System—Product Summary, Midland Loan Services.

Enterprise! Loan Management System, Version 3.3 Life Insurance Accounting Module—Product Summary Midland Loan Services, Sep. 2001.

State of Research and Development at Midland Loan Services, Midland Loan Services.

Enterprise! (printout of video), Midland Loan Services.

U.S. Appl No. 11/796,371, filed Apr. 27, 2007.

U.S. Appl. No. 12/140,621, filed Jun. 17, 2008.

ZENetics, dual-sided, tri-fold brochure, Arlington, Texas, 2 pages.

"Enterprise!" Univest Financial Group, LLC, Loan Management System Demo for CSSA Conference, Apr. 27, 1999.

"Enterprise", Version 3.2, Midland Loan Services.

Shea, L, "Monitor an Enterprise of SQL Servers—Automating Management by Exception with Perl", The 3rd Large Installation System Administration of Windows NT onference, Aug. 2000. Accessed Dec. 26, 2001 at http://www.usenix.org/events/lisa-nt2000/full_papers/shea/shea_html/.

(56) References Cited

OTHER PUBLICATIONS

"Object/Relational Mapping using Generic Business Objects", Difference between Generic Business Objects and Custom Business Objects, 4 pages. Accessed Dec. 31, 2001 at http://userserols.com/goldinj/mtos/gbos.html.

Ambler S., "Object-Oriented Business Rules", How to record the transactional logic behind UML object models, Software Development Online, Jun. 2000, 5 pages. Accessed Dec. 31, 2001 at http://www.sdmagazine.com/documents/s=743/sdm0006j/0006j.htm.

Dr. Paul Dorsey, "Implementing Business Rules", Dulcian, Inc., 1998, 12 pages. Accessed Dec. 31, 2001 at http://www.dulcian.com/papers/Implementing%20Business%20Rules.htm.

"Project Horizon—Operation A to Z", 9 pages, in Power Point form.

"Midland Loan Services—E! PAAS Data Design", 65 pages.

"Data Dictionary", Aug. 25, 2001, 131 pages.

Office Action dated Feb. 20, 2009 in U.S. Appl. No. 12/140,621.
Office Action dated Nov. 6, 2009 in U.S. Appl. No. 12/140,621.
Office Action dated May 19, 2010 in U.S. Appl. No. 12/140,621.
Office Action dated Feb. 3, 2011 in U.S. Appl. No. 12/140,621.
Office Action dated Aug. 29, 2011 in U.S. Appl. No. 12/140,621.
Office Action dated Feb. 27, 2012 in U.S. Appl. No. 12/140,621.

"SS&C Technologies, Inc.—Markets: Real Estate: Loan Management," printed from http://www.sscinc.com/markets/real_estate/default.asp?P=2, Internet site, accessed on Nov. 27, 2001, 1 page.

"SS&C Technologies, Inc.—LMS: Screen Shots" "Report Screen Shot," printed from http://www.sscinc.com/lms/screen_shots.asp?P=2 Internet site, accessed on Nov. 27, 2001, 1 page.

"SS&C Technologies, Inc.—LMS: Screen Shots" "Investor Reporting Module-Pool Setup," printed from http://www.sscinc.com/lms/screen_shots.asp?P=3, Internet site, accessed on Nov. 27, 2001, 1 page.

"SS&C Technologies, Inc.—LMS: Screen Shots" "Collateral Management," printed from http://www.sscinc.com/lms/screen_shots.asp?P=5, Internet site, accessed on Nov. 27, 2001, 1 page.

"SS&C Technologies, Inc.—LMS: Screen Shots" "SnapShots Screen Shot" printed from http://www.sscinc.com/lms/screen_shots.asp?P=9, Internet site, accessed on Nov. 27, 2001, 1 page.

Definition of "Associate" *Webster's Revised Unabridged Dictionary*, (1913+1828)—The ARTFL Project,, 1913 edition, printed from http://machaut.uchicago.edu/?action=seach&word=associate&resource=Webster%27s&q, Internet site, accessed on Feb. 17, 2009, 3 pages.

Midland Loan Services advertising tri-fold pocket folder, Overland Park, Kansas, Sep. 2002, 8 pages.

\* cited by examiner

VISUAL ASSET STRUCTURING TOOL

TECHNICAL FIELD

The present invention relates generally to a system and technique for presenting relational information and, more particularly, to a tool and process for automatically presenting a visual representation of a relationship between entities involved in a commercial deal.

BACKGROUND

In today's real estate environment, a typical commercial deal such as a loan transaction, servicing agreement, or cash management agreement may involve numerous entities such as loan assets, businesses, and properties that serve as collateral, for example. The relationships among and obligations of such entities may be quite complicated and may become more complex over the lifetime of the commercial deal. Effectively comprehending and communicating the nature of a deal may be a cumbersome task involving a length study of detailed financial documentation and complex ownership structures, servicing relationships, and cash flows.

To alleviate some of this complexity, an underwriter may choose to create a visual representation of the commercial deal. The visual representation may be used, for example, as an exhibit to summarize and/or verify details of the deal. While a visual representation indeed may be useful, creating such a visual representation may be a complex process in itself. Namely, an underwriter typically must sort through the text of loan documents and agreements to extrapolate the relevant information and then use a peripheral tool to generate a diagram of the transaction. In general, the peripheral tool may be a software application that allows a user to define a structure by manually selecting and interconnecting various shapes. An example of a peripheral tool that may be used in this scenario is the Microsoft® Visio® Organization Chart application.

The use of a peripheral tool to create a visual representation duplicates work and allows for a high margin of error and possible misrepresentation of information. Accordingly, there exists the need for a system and method for automatically presenting a visual representation of a relationship between entities involved in a commercial deal such as a loan transaction, servicing agreement, or cash management agreement.

SUMMARY

In one general aspect, a commercial deal is graphically represented by defining entities, assigning roles for relating entities, accessing commercial deal information corresponding to the entities, defining objects for related entities, and automatically generating a visual representation depicting a relationship between entities involved in a commercial deal.

Implementations may include one or more of the following features. For example, the commercial deal may include one or more loan transactions, servicing agreements, and/or cash management agreements. The entities may include assets, businesses, individuals, properties, collateral, and/or accounts. The roles may include borrower, shareholder, investment, property manager, underwriter, principal, closer, employer, and employee.

Entities may be defined by receiving entity information describing specific attributes of the entities such as entity type, tax identification number, name, telephone number, facsimile number, address, website address, and/or parent company relationship. Roles may be assigned by receiving role information associated with a selected entity such as the specific roles assumed by the entity, the timing of each specific role, role relationship information for associating the selected entity with one or more other entities, and/or assignment information for assigning a selected entity to the commercial deal.

The role relationship information may include roles assumed by a selected entity, the identity of other entities related to the selected entity, roles assumed by each of the other entities, and/or exposure of each other entity. The assignment information may include roles assumed by a selected entity, associated type, the entity to associate, and/or timing of each role. The commercial deal information may include one or more of loan information, property information, cash management agreement information, and servicing agreement information.

The objects may include one or more of a shape, an image, a picture, a photograph, and a graphic. Objects may be defined by automatically associating an object with an entity based on one or more of entity information, role information, and commercial deal information. Generating the visual representation may involve automatically making connections between objects to convey the relationship between entities.

Implementations also may include incorporating the visual representation into the commercial deal information and/or rendering the visual representation to a user as structure of objects joined by connectors. The structure may be rendered in multiple modes and multiple levels. The modes may correspond to ownership structures, cash flow structures, and servicing relationship structures. Increasing levels may increase the number of objects displayed in the visual representation.

Aspects of the present invention may be implemented by an apparatus and/or by a computer program stored on a computer readable medium. The computer readable medium may comprise a disk, a client device, a network device, a host device, and/or a propagated signal.

Other features and advantages will be apparent from the following description, including the drawings, and from the claims.

DETAILED DESCRIPTION

Figure 1:
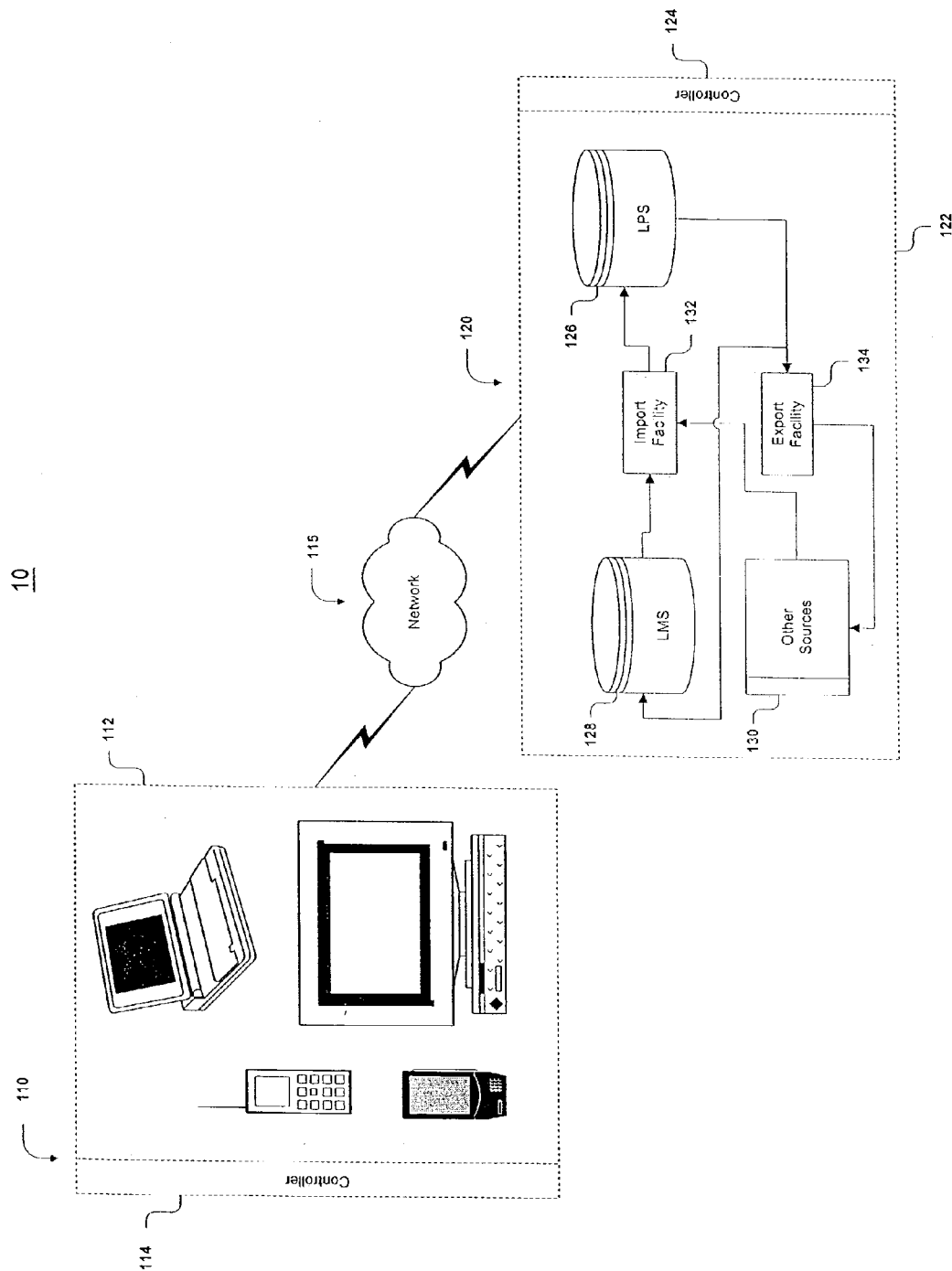
FIG. 1 illustrates one embodiment of a communications system for presenting a visual representation according to the present invention.

FIG. 1 illustrates one embodiment of an exemplary communications system 10 for automatically presenting a visual representation depicting a relationship between entities involved in a commercial deal. For brevity, several elements in figure are represented as monolithic structures. It is to be understood, however, that each structure may include numerous interconnected computing elements and/or components designed to operate according to aspects of the present invention.

As shown, the communications system 10 includes a client system 110 connected through a network 115 to a host system 120. The client system 110 and the host system 120 are configured to communicate and exchange information through the network 115. The host system 120 may include and/or form part of an information delivery network, such as, for example, the Internet, the World Wide Web (Web), an on-line service provider, a private network, and/or any other analog or digital wired and/or wireless network that provides information.

In general, the client system 110 includes a computer system having hardware and/or software components for communicating with the network 115 and the host system 120. The client system 110 and host system 120 each may include one or more general-purpose computers (e.g., personal computers and/or servers), one or more special-purpose computers (e.g., devices specifically programmed to communicate with each other), or a combination of one or more general-purpose computers and one or more special-purpose computers. The client system 110 and host system 120 may be structured and arranged to communicate using various communication protocols (e.g., HTTP, TCP/IP, WAP, UDP) to establish connections between network elements and/or to operate within or in concert with one or more other systems (e.g., the Internet and/or Web).

In one implementation, the client system 110 and the host system 120 each include a device (e.g., client device 112, host device 122) operating under the command of a controller (e.g., client controller 114, host controller 124). The broken lines are intended to indicate that in some implementations, the controller, or portions thereof considered collectively, may instruct one or more elements of the device to operate as described. Accordingly, the function of automatically presenting a visual representation of a relationship between entities involved in a commercial deal may be implemented as software controlling one or more elements of the client system 110 and/or the host system 120.

An example of a device is a general-purpose computer capable of responding to and executing instructions in a defined manner. Other examples include a special-purpose computer, a personal computer (PC), a workstation, a server, a laptop computer, a web-enabled telephone, a web-enabled personal digital assistant (PDA), a microprocessor, and integrated circuit, or any other component, machine, tool, equipment, or some combination thereof capable of responding to and executing instructions.

An example of a controller is a software application (e.g., operating system, browser application, client application, server application, proxy application, on-line service provider application, and/or private network application) installed on a device for directing communications. Other examples include, a computer program, code, set of instructions, or some combination thereof, for independently or collectively instructing the device to interact and operate as programmed. The controller may be implemented utilizing any suitable computer language (e.g., Java, Perl, C or C++) and/or object-oriented techniques. The controller also may be a device, such as a workstation or PC, a microprocessor, a network server, a Java virtual machine, or an application-specific integrated circuit.

The controller may be embodied permanently or temporarily in any type of machine, component, physical or virtual equipment, storage medium, or propagated signal capable of delivering instructions to a device. In particular, the controller (e.g., software application, computer program) may be stored on a storage medium (e.g., disk, device, or propagated signal), readable by a computer system, such that if the storage medium is read by the computer system, the functions described herein are performed.

The network 115 may include one or more delivery systems for directly or indirectly connecting the client system 110 and the host system 120. Examples of delivery systems include, but are not limited to, a local area network (LAN), a wide area network (WAN), the Internet, the Web, a telephony network (e.g., analog, digital, wired, wireless, PSTN, ISDN, or xDSL), a radio network, a television network, a cable network, a satellite network, and/or any other wired or wireless communications network configured to carry data. Each network may include one or more elements, such as, for example, intermediate nodes, proxy servers, firewalls, routers, switches, adapters, sockets, and wired or wireless data pathways, configured to direct and/or deliver data.

The client system 110 and the host system 120 communicate in order to present a visual representation depicting a relationship between entities involved in a commercial deal. In one implementation, the client system 110 may include a personal computer running a browser application and the host system 120 may include one or more servers running various software applications (e.g., Web applications). The client system 110 may display various graphical user interfaces (UIs), such as Web pages, that request input from and deliver content to the user. For example, the user may input requested information into a series of UIs and then be presented with a visual representation depicting a relationship between entities involved in a commercial deal.

As shown in FIG. 1, the host system 120 may include a loan production system (LPS) 126 and a loan management system (LMS) 128. The LPS 126 may be configured to present data to the client system 110, which in turn, presents various graphical UIs to a user. The LPS 126 also may receive information from the LMS 128 and other sources 130 through an import facility 132 and may provide information to the LMS 128 and to other sources 130 through an export facility 134. It is to be understood that while the LPS 126, the LMS 128, the other sources 130, the import facility 132, and the export facility 134 are shown as monolithic structures, each may include numerous elements (e.g., servers, routers, switches, firewalls, sockets, databases, tables, disks, hard drives, etc.) in various embodiments of the host system 120.

In general, the LPS 126 and the LMS 128 may perform data entry, data retrieval, and/or data processing for integrating and automating a commercial deal. For example, the LPS 126 and the LMS 128 may perform various functions related to origination and underwriting, servicing and asset management, accounting, investor reporting and special servicing. In one embodiment, the LPS 126 and/or the LMS 128 may include or form part of one or more of the systems described in co-pending U.S. patent application. Ser. No. 10/336,501, entitled "Methods and Systems for Asset/Loan Management and Processing," which was filed on Jan. 3, 2003 and is incorporated by reference in its entirety.

Figure 2:
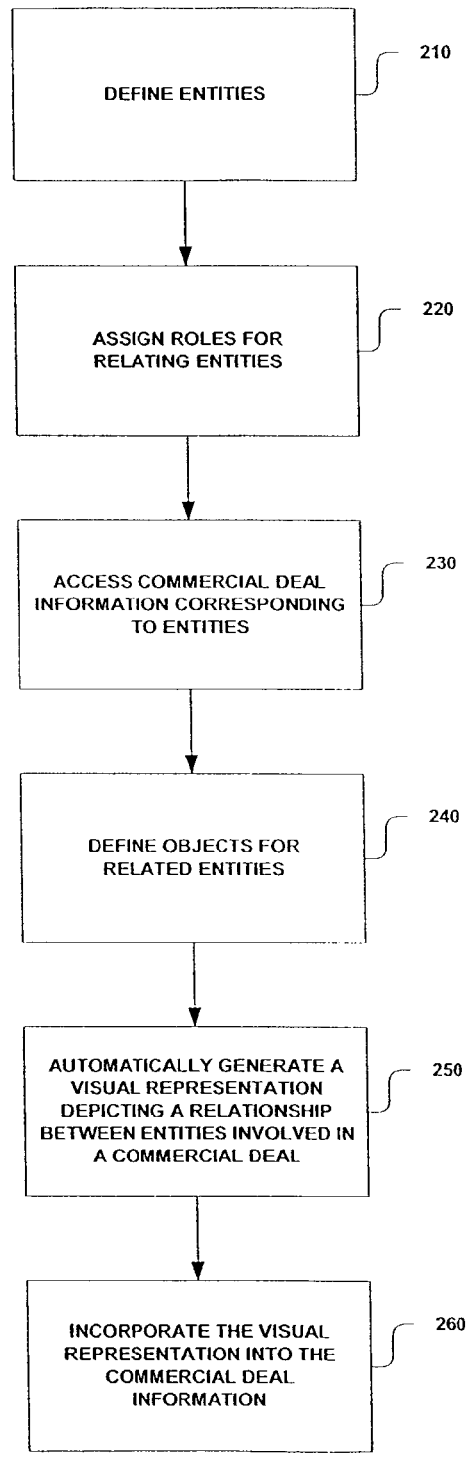
FIG. 2 is a flowchart of one embodiment of a method for presenting a visual representation according to the present invention.

Referring to FIG. 2, the communications system 10 operates according to a procedure 200 for presenting a visual representation depicting a relationship between entities involved in a commercial deal. The procedure 200 generally involves defining entities (step 210), assigning roles for relating entities (step 220), accessing commercial deal information corresponding to the entities (step 230), defining objects for related entities (step 240), automatically generating a visual representation depicting a relationship between entities involved in a commercial deal (step 250), and incorporating the visual representation into the commercial deal information (step 260).

The procedure 200 will be described below with reference to FIGS. 1-11. While particular embodiments and examples are described and illustrated, the procedure 200 may be implemented by any suitable type of hardware (e.g., device, computer, computer system, equipment, component); software (e.g., program, application, instruction set, code); storage medium (e.g., disk, device, propagated signal); or combination thereof.

At step 210, an entity is defined. An entity may be, for instance, an asset, a business or business unit, an individual, a loan, collateral such as property, an account, and/or any other component of a commercial deal. The commercial deal may include one or more transactions such as, for example, loan transactions, servicing agreements, and/or cash management agreements.

In one implementation, a particular entity involved in a commercial deal may be defined by receiving entity information that describes specific attributes of the entity. The entity information may include, for example, data such as entity type (e.g., individual, corporation, limited partnership, limited liability company), tax identification number, company name, telephone number, facsimile number, address (e.g., street, city, state, postal code, country), website address, and parent company relationship.

The entity information may be received from one or more of the client system 110, the network 115, and/or the host system 120. In some cases, the entity information may be input by a user of a client system 110 and delivered across a network 115 to the host system 120. For example, a user may enter data into one or more graphical UIs structured and arranged to solicit and/or display the entity information. In other cases, the entity information may be extracted from one or more electronic files residing in the host system 120. For example, electronic files containing data pertaining to a commercial deal may be stored in the host system 120 and continuously updated over the lifetime of the deal. The data from these electronic files may be extracted and utilized by the host system 120 in response to a command to graphically depict the relationship among entities involved in the commercial deal.

Figure 3:
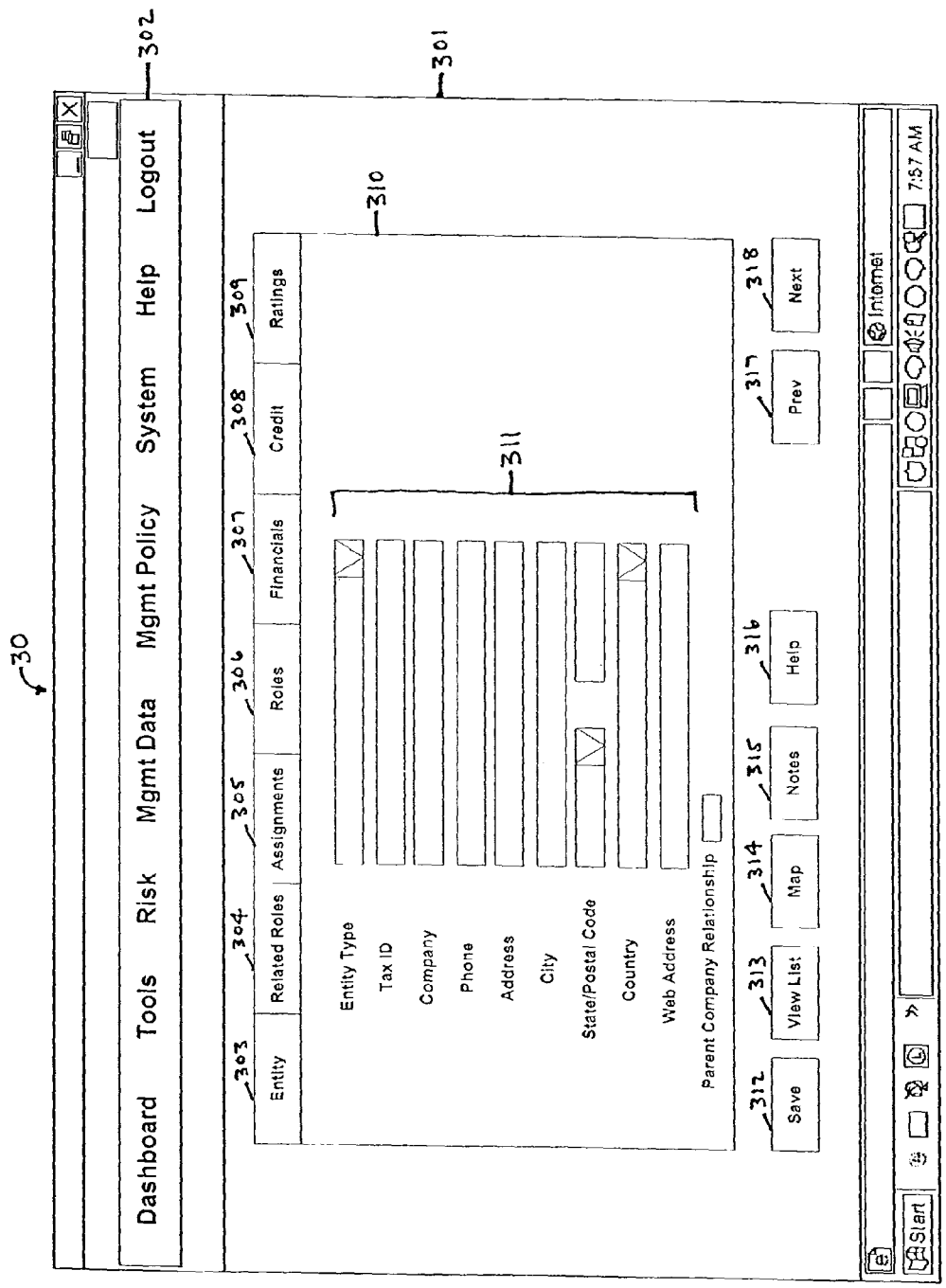
FIG. 3 illustrates one embodiment of a user interface for soliciting and/or displaying entity information according to the present invention.

FIG. 3 illustrates an exemplary UI 30 that may be used to solicit and/or display entity information. In one implementation, the UI 30 may be displayed to a user through a client system 10 such as a personal computer running a Web browser application. In some cases, the user may be required to provide security information (e.g., user name and password) to gain access to the UI 30.

The UI 30 includes browser window 301 configured to display content of a Web site and receive user input. The browser window 301 includes a tool bar 302 for navigating to various areas of the Web site such as a Dashboard area, a Tools area, a Risk Management area, a Data Management area, a Policy area, a System area, a Help area, and a Logout area. The browser window 301 also includes an Entity tab 303, a Related Roles tab 304, an Assignments tab 305, a Roles tab 306, a Financials tab 307, a Credit tab 308, and a Ratings tab 309 for displaying pages corresponding to the tabs.

As shown, the browser window 301 displays an Entity page 310 including text entry boxes 311 for viewing and/or entering entity information. The Entity page 310 may be displayed, for example, when the Entity tab 303 is selected. When presented with the Entity page 310, a user may input text and/or use pull-down menus to enter the entity information into the appropriate text entry boxes 311. The Entity page 310 also includes a Save button 312 for saving entity information, a View List button 313 for viewing a list of entities, a Map button 314 for mapping the location of an entity, a Notes button 315 for entering or displaying comments, a Help button 316 for displaying help information, a Prev button 317 for displaying the previous page, and a Next button 318 for displaying the next page.

At step 220, roles for relating entities are assigned. In general, an entity may assume various roles in a commercial deal and each role may define the relationship of the entity to another entity, an asset, and/or the commercial deal as a whole. Some examples of roles that may be assigned to an entity include, but are not limited to: borrower, shareholder, investment, property manager, underwriter, principal, closer, employer, employee, and/or other part assumed in a commercial deal.

In one implementation, roles may be assigned by receiving role information associated with a selected entity. The role information may include, for instance, the specific roles assumed by the selected entity, the timing (e.g., beginning date, ending date) of each specific role. The role information further may include role relationship information for associating the selected entity with one or more other entities and assignment information for assigning a selected (primary) entity to the commercial or asset. The role relationship information may include, but is not limited to: the roles assumed by a selected entity, the identity (e.g., name, contact information) of other entities related to the selected entity, the role assumed by each of the other entities, and the exposure of each other entity. The assignment information may include, but is not limited to: the roles assumed by a selected (primary) entity, the associated type (e.g., asset, deal), the entity to associate, and the timing (e.g., beginning date, ending date) of each role.

For example, in a particular loan transaction, Company A may have a role as a borrower as well as additional roles as a shareholder of Company B and an investment of Company C. Company A may be considered the primary entity due to its role as the borrower and thus may be assigned to the asset or deal in this case. With respect to Company A, Company B may be designated the role of investment and Company C may be designated the role of shareholder. Assuming complete ownership by each shareholder, the exposure of each shareholder is 100%.

The role information may be received from one or more of the client system 110, the network 115, and/or the host system 120. In some cases, the role information may be input by a user of a client system 110 and delivered across a network 115 to the host system 120. For example, a user may enter data into one or more graphical UIs structured and arranged to solicit and/or display the role relationship information. In other cases, the role relationship information may be extracted from one or more electronic files residing in the host system 120. For example, electronic files containing data pertaining to a commercial deal may be stored in the host system 120 and continuously updated over the lifetime of the deal. The data from these electronic files may be extracted and utilized by the host system 120 in response to a command to graphically depict the relationship among entities involved in the commercial deal.

Figure 4:
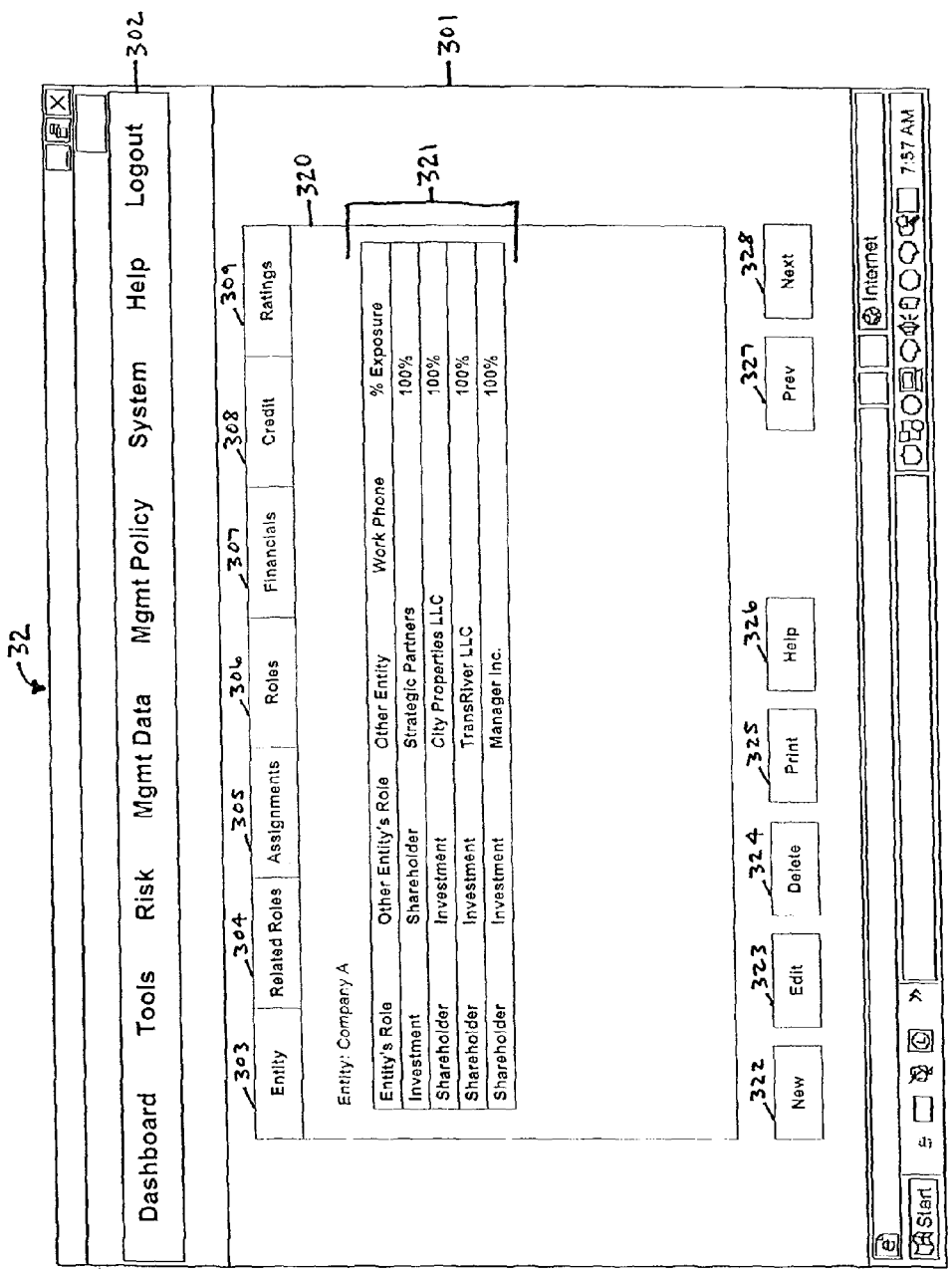
FIGS. 4-6 illustrate one embodiment of a set of user interface for soliciting and/or displaying role information according to the present invention.
Figure 5:
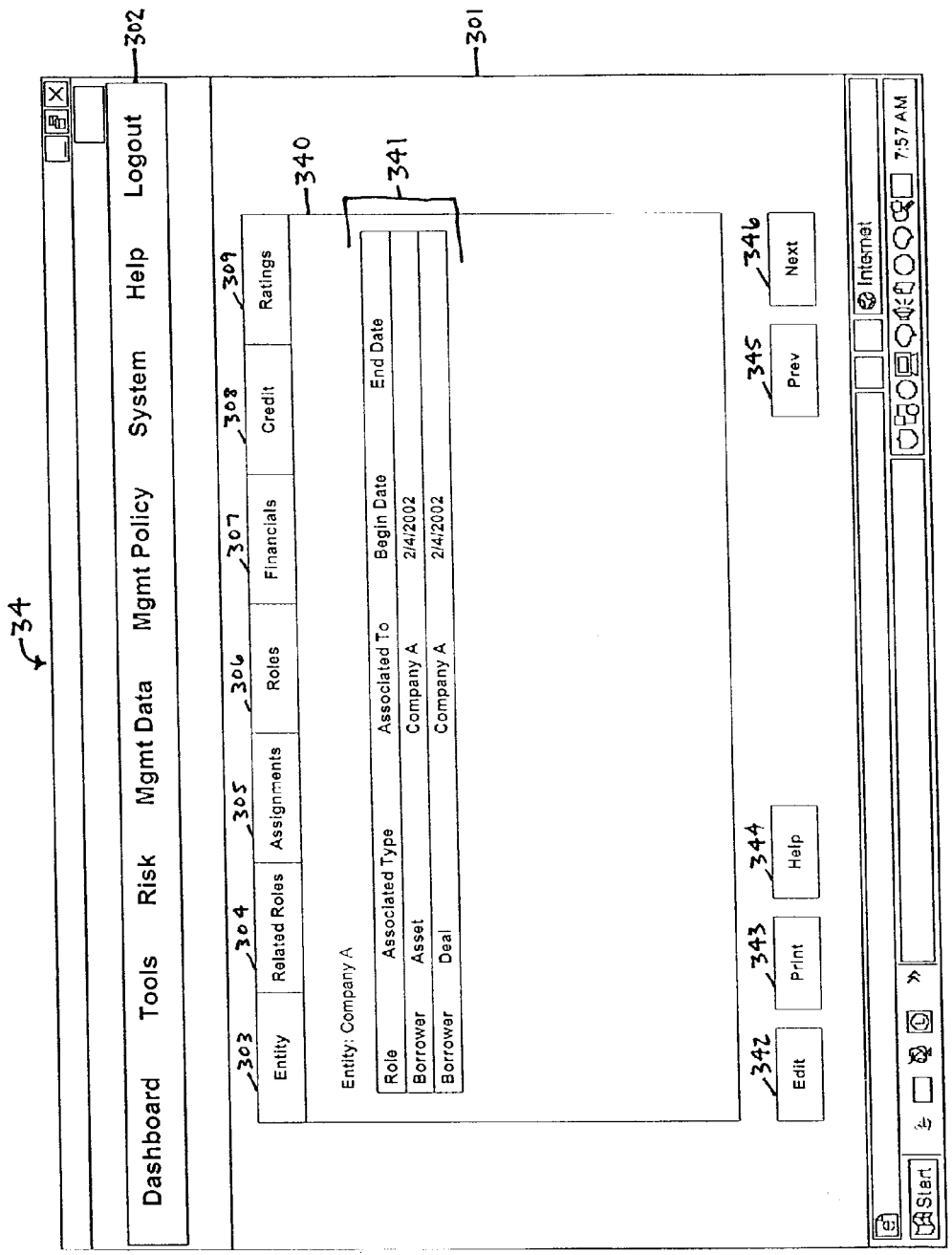
Figure 6:
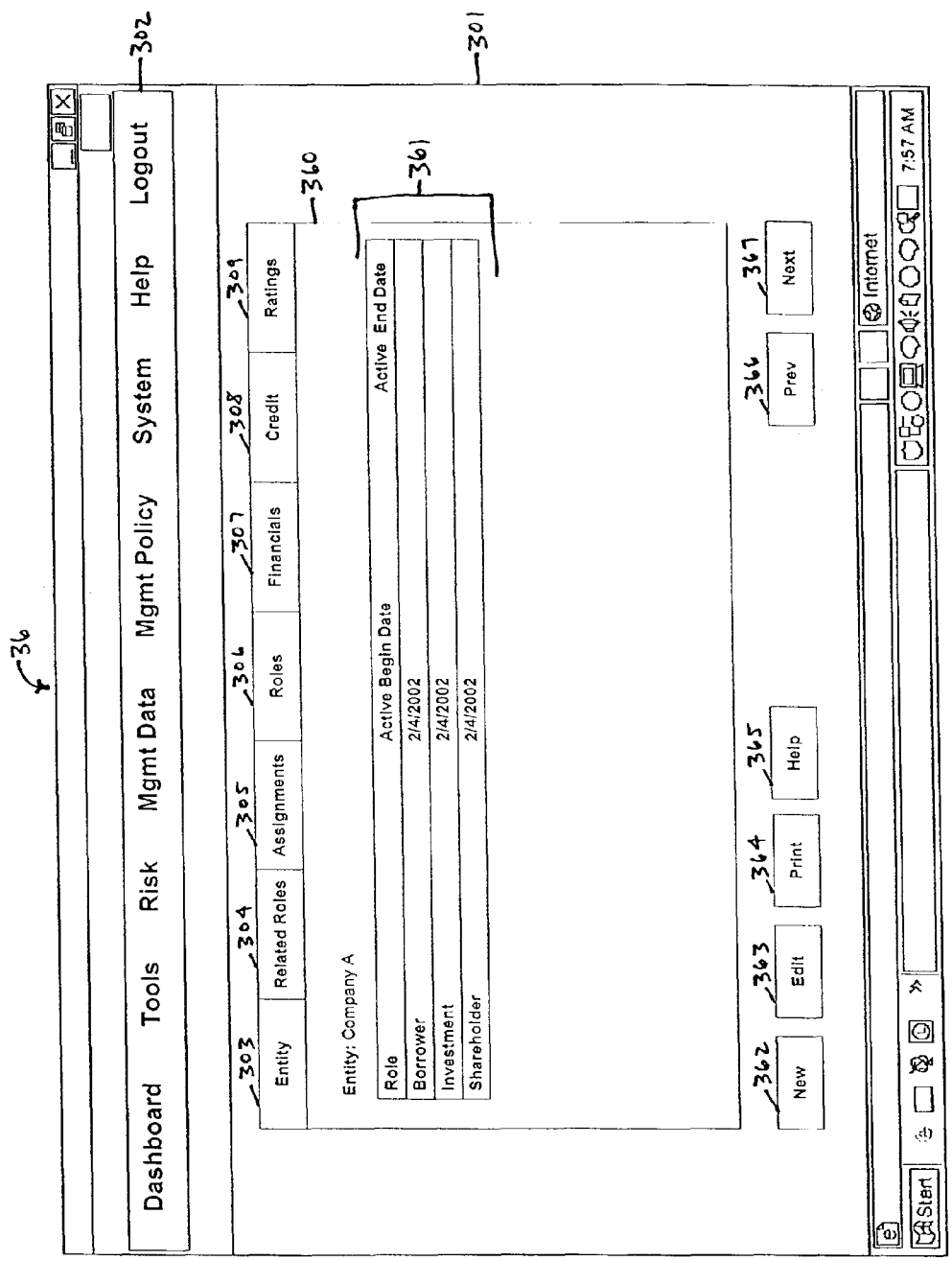

FIGS. 4-6 respectively illustrate a UI 32, a UI 34, and a UI 36 that may be used to solicit and/or display role information. In one implementation, the UIs may be displayed to a user through a client system 110 such as a personal computer running a Web browser application. Each of the UIs includes a browser window 301 configured to display content of a Web site and receive user input. The browser window 301 includes a tool bar 302 for navigating to various areas of the Web and tabs 303-309 for displaying corresponding pages, as described above.

Referring to FIG. 4, the browser window 301 of the UI 32 displays a Related Roles page 320 including a table 321 for viewing and/or entering related role information such as the roles assumed by a selected entity, the identity (e.g., name, contact information) of other entities related to the selected entity, the role assumed by each of the other entities, and the exposure of each other entity. The Related Roles page 320 may be displayed, for example, when the Related Roles tab 304 is selected. When presented with the Relate Roles page 320, a user may enter the related role information into the appropriate rows and columns of the table 321. The Related Roles page 320 also includes a New button 322 for creating a new table entry, an Edit button 323 for editing a table entry, a Delete button 324 for deleting a table entry, a Print button 325 for printing the table, a Help button 326 for displaying help information, a Prev button 327 for displaying the previous page, and a Next button 328 for displaying the next page.

Referring to FIG. 5, the browser window 301 of the UI 34 displays an Assignments page 340 including a table 341 for viewing and/or entering assignment information such as the roles assumed by a selected (primary) entity, the associated type (e.g., asset, deal), the entity to associate, and the timing (e.g., beginning date, ending date) of each role. The Assignments page 340 may be displayed, for example, when the Assignments tab 305 is selected. When presented with the Relate Roles page 340, a user may enter the assignment information into the appropriate rows and columns of the table 341. The Assignments page 340 also includes an Edit button 342 for editing a table entry, a Print button 343 for printing the table, a Help button 344 for displaying help information, a Prev button 345 for displaying the previous page, and a Next button 346 for displaying the next page.

Referring to FIG. 6, the browser window 301 of the UI 36 displays a Roles page 360 including a table 361 for viewing and/or entering role information such as the specific roles assumed by the selected entity, the timing (e.g., beginning date, ending date) of each specific role. The Roles page 360 may be displayed, for example, when the Roles tab 306 is selected. When presented with the Roles page 360, a user may enter the role information into the appropriate rows and columns of the table 361. The Roles page 360 also includes a New button 362 for creating a new table entry, an Edit button 363 for editing a table entry, a Print button 364 for printing the table, a Help button 365 for displaying help information, a Prev button 366 for displaying the previous page, and a Next button 367 for displaying the next page.

At step 230, commercial deal information corresponding to associated entities is accessed. In general, the commercial deal information includes specific details of a relationship between associated entities. For example, the commercial deal information may include details regarding the relationships and obligations of entities involved in loan transactions, servicing agreements, and/or cash management agreements.

In an implementation, where entities are involved in a loan transaction, the commercial deal information may include specific details of the loan such as loan name, loan status, loan number, loan date, loan term, rate type (e.g., fixed or variable), interest rate, loan amount, and/or other attributes of the loan. The commercial deal information also may include specific details of the property associated with the loan such as property name, loan name, lien type, allocated percentage of loan, property type, square footage or units, allocated loan balance, engineering and environmental reports, tenants, valuator, valuation, and/or other attributes of the property.

In an implementation, where entities are involved in a servicing agreement, the commercial deal information may include specific details of the conditions and services provided among entities (e.g., trust, third-party servicer) and/or any other attributes of the servicing agreement. In an implementation where entities are involved in a cash management agreement, the commercial deal information may include specific details of property and deal level cash flow streams and waterfall requirements among entities (e.g., bank accounts) and/or any other attributes of the cash management agreement.

The commercial deal information may be accessed from one or more of the client system 110, the network 115, and/or the host system 120. In some cases, the commercial deal information may be input by a user of a client system 110 and delivered across a network 115 to the host system 120. For example, a user may enter data into one or more graphical UIs structured and arranged to solicit and/or display the role relationship information. In other cases, the role relationship information may be extracted from one or more electronic files residing in the host system 120. For example, electronic files containing data pertaining to a commercial deal may be stored in the host system 120 and continuously updated over the lifetime of the deal. The data from these electronic files may be extracted and utilized by the host system 120 in response to a command to graphically depict the relationship among entities involved in the commercial deal.

In one embodiment, the commercial deal information may be input into and/or accessed from one or more of the systems described in U.S. patent application Ser. No. 10/336,501, entitled "Methods and Systems for Asset/Loan Management and Processing," which was filed on Jan. 3, 2003 and is incorporated by reference in its entirety.

At step 240, an object is defined for each associated entity. In general, each entity involved in a commercial deal may be represented as an object. An object may be, for example, a shape, an image, a picture, a photograph, a graphic, and/or any other type of element capable of depicting the entity in a graphical representation of the deal.

In one implementation, an object may be defined by associating a shape or image with a particular entity. In some cases, the associated shape or image may correspond to the type of entity. For example, a loan may be associated with a shaded rectangle, an individual may be associated with an image of a person, and a property may be associated with an image of a building. In other cases, the associated shape or image may be unique for each entity or the same for all entities.

In one embodiment, an object may be associated with an entity automatically according to information entered into and/or stored in the system (e.g., client system 110, host system 120). For instance, entities may be associated with objects automatically based on one or more of the entity information, the role information, and the commercial deal information. In some cases, objects may auto-fill based on the entity information, role information, and/or commercial information. For example, an object representing an entity may be labeled to include information such as the name of the entity (e.g., business name), the role of the entity (e.g., borrower), and/or transactional information (e.g., loan amount).

A system (e.g., client system 110, host system 120) may automatically associate entities with objects. In addition, a user may have the ability to directly associate entities with objects and/or supplement information included with objects. For instance, a user may select an object that will be used to depict an entity and then add text or further details to the object. The user also may edit the shape, image, and/or text of a user-selected object and/or an object automatically associated by the system. In some situations, the user may associate multiple entities with a single object in order to simply the structure of the commercial deal.

At step 250, a visual representation depicting a relationship between entities involved in the commercial deal is generated automatically. In general, connections are made automatically between various objects to convey the relationship between entities. In one implementation, the connections between objects are made based on information entered into a system (e.g., client system 110 and/or host system 120). Such information may include, but is not limited to entity information, role information, and/or commercial deal information.

Because the connections between objects are made automatically, the user does not need to extrapolate data, determine which objects and connections are necessary, or rely on an external program. In addition, flexibility is provided for continuously and automatically updating the visual representations as the structure of the deal, assets, and/or entities changes over time. For example, the system (e.g., client system 110 and/or host system 120) may auto-generate a beginning connecting structure and then adapt the structure as the commercial deal evolves by adding, moving, connecting, and/or reconnecting multiple connectors and objects.

At step 260, the visual representation is incorporated into the commercial deal information. In general, each visual representation may be saved and attached to an appropriate commercial deal. In one implementation, the visual representation may be saved as part of the commercial deal information (e.g., loan record or collateral record) to provide a user with a comprehensive record of the deal. As such, a user may have access to the specific details of the commercial deal as well as a visual representation of the commercial deal without having to locate a file in a peripheral directory.

Once generated, the visual representation may be rendered to a user. In one implementation, the visual representation may be rendered to a user through a client system 110, such as a personal computer running a browser application. The visual representation may be presented as a graphical UI, such as a Web page. The UI may be configured to display the visual representation to the user in response to a command to graphically depict the relationship among entities involved in a commercial deal.

In one embodiment, the visual representation may include a structure of interconnected objects. The structure may be, for example, an organizational chart, a flow chart, a process chart, a block diagram, a tree diagram, a network diagram, a conceptual diagram, a relational diagram, a map, and/or any other interrelationship structure. In general, the visual representation may depict the relationship among entities as connectors joining the objects associated with the entities. Each connector may be displayed as a line segment having end points at related objects. The connectors also may be labeled with text to identify the particular type of relationship. In some cases, the connector may have characteristics (e.g., color, thickness, dashed, etc.) depending on the type of relationship between entities.

In one implementation, the visual representation may be displayed in one or more modes to convey relational information for various scenarios. For example, a user may be able to specify through a dropdown field the mode and/or level at which to view the presented information. In general, the visual representation may have modes corresponding to ownership structures, cash flow diagrams, and/or servicing relationship diagrams. By selecting the desired mode, a user may view multiple charts (e.g., ownership structures, cash flow diagrams, and/or servicing relationship diagrams) based on the same underlying information.

In addition, each visual representation may have multiple levels of detail. For example, at level one, only certain entities may be represented, while changing the field to level two or level three may allow the user to view all related entities within the structure. In one implementation, the level may correspond to roles and/or relationships of the commercial deal. Namely, at a particular level only those objects representing entities having certain roles and/or relationships are displayed. In general, a level one view will provide a high-level structure displaying objects representing the fundamental entities of the commercial deal. Increasing levels, in turn, increases the number of objects displayed in the visual representation.

In some embodiments, several visual representations corresponding to various modes and levels may be presented to a user for selection of the most appropriate visual representation. In other embodiments, a default visual representation may be presented to a user based on the type of commercial deal. The user may be provided with the ability to manipulate the visual representation so that the structure that best fits the parameters of the commercial deal is displayed. Tools may be provided to move, edit, and/or combine objects in the visual representation. In addition, search buttons and criteria may be provided to locate specific data in the underlying information and/or visual representation.

Figure 7:
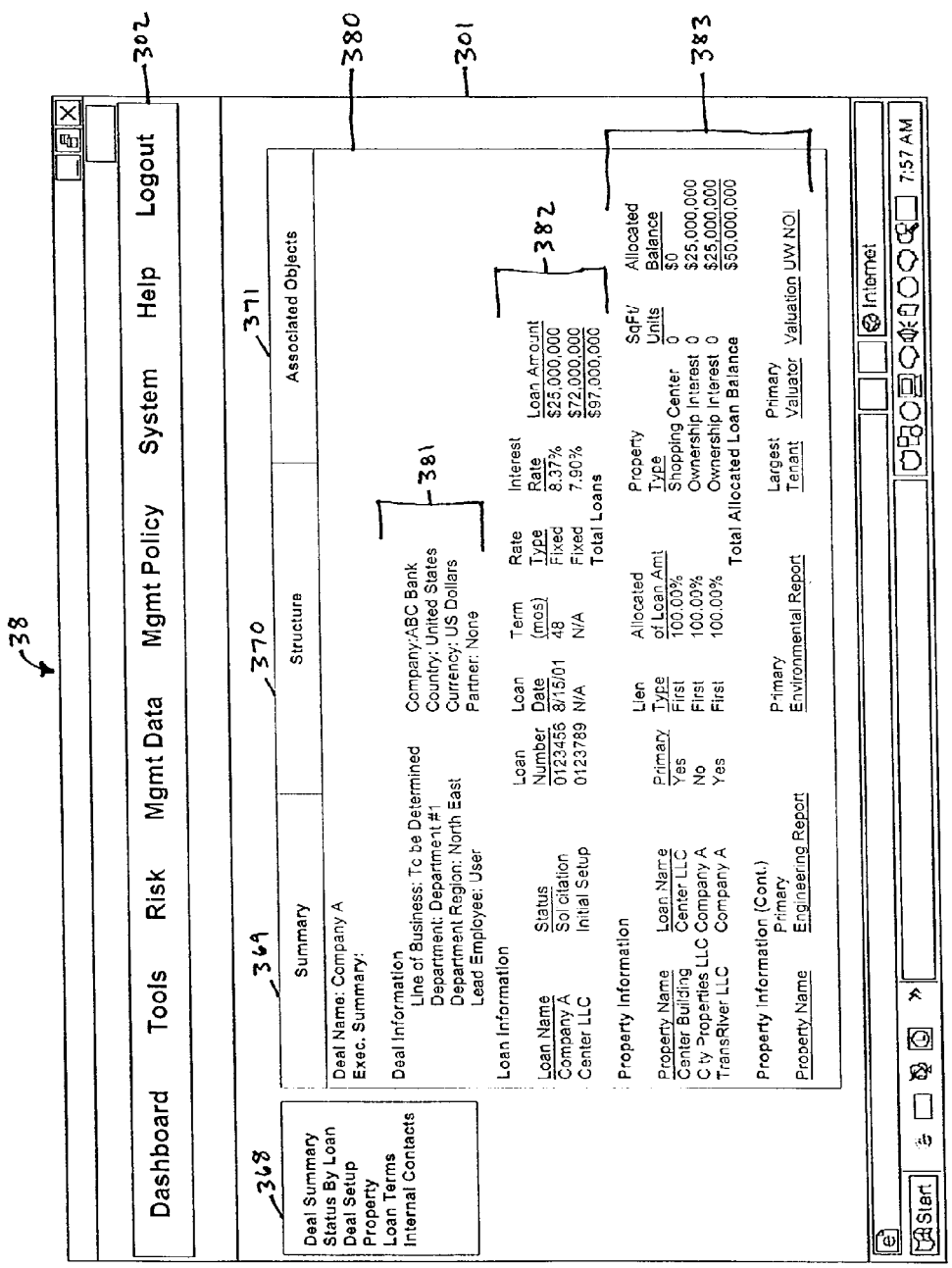
FIG. 7 illustrates one embodiment of a user interface for displaying commercial deal information according to the present invention.
Figure 8:
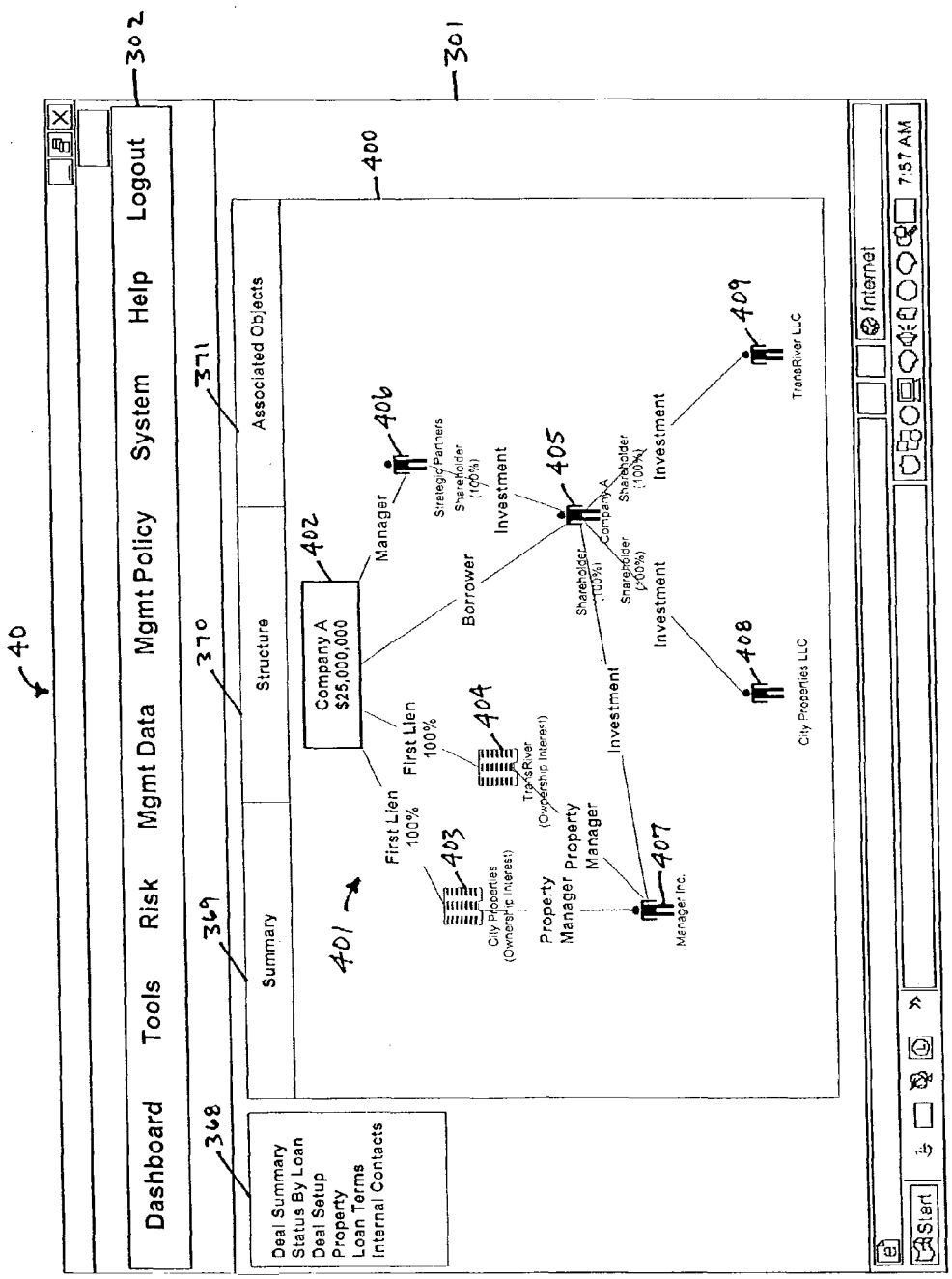
FIG. 8 illustrates one embodiment of a user interface for displaying a visual representation of an ownership structure according to the present invention.

FIGS. 7 and 8 respectively illustrate a UI 38 and a UI 40 that may be used to display specific details of the commercial deal and a visual representation depicting a relationship between entities involved in the commercial deal. In one implementation, the UIs 38, 40 may be displayed to a user through a client system 110 such as a personal computer running a Web browser application. As shown, each the UIs 38, 40 include a browser window 301 configured to display content of a Web site and receive user input. The browser window 301 includes a tool bar 302 for navigating to various areas of the Web such as a Dashboard area, a Tools area, a Risk Management area, a Data Management area, a Policy area, a System area, a Help area, and a Logout area. The browser window 301 also includes menu 368 for rendering different views of the commercial deal as well as a Summary tab 369, a Structure tab 370, an and an Associated Objects tab 371 for displaying pages corresponding to the tabs.

Referring to FIG. 7, the browser window 301 of the UI 38 includes a Summary page 380 displaying deal information 381, loan information 382, and property information 383. The Summary page 380 may be displayed, for example, when the Summary tab 369 is selected. In one implementation, the deal information 381 may include, but is not limited to: line of business, department, department region, lead employee, company, country, currency, and partner. The loan information 382 may include, but is not limited to: loan name, loan status, loan number, loan date, loan term, rate type, interest rate, and loan amount. The property information 383 may include, but is not limited to: property name, loan name, lien type, allocated percentage of loan, property type, square footage or units, allocated loan balance, engineering and environmental reports, tenants, valuator, and valuation. When presented with the Summary page 380, a user may review specific details of the commercial deal and/or validate the correct entry of the commercial deal information.

Referring to FIG. 8, the UI 40 includes one embodiment of a Structure page 400 that displays a visual representation 401 depicting a relationship between entities involved in the commercial deal. In this embodiment, the visual representation 401 includes an ownership (asset) structure depicting relationships among related entities including a loan asset 402, several properties 403, 404, and various businesses 405-409.

As shown, the relationships between the loan asset 402 and each of the first property 403 and the second property 404 are depicted as first lien connectors, the relationship between the first business 405 and the loan asset 402 is depicted as a borrower connector, the relationship between the second business 406 and the loan asset 402 is depicted as a manager connector, and the relationship between the second business 406 and the first business 405 is depicted as an investment connector. In addition, the relationships between the third business 407 and each of the first property 403 and the second property 404 are depicted as property manager connectors. The relationship between the first business 405 and each of the third business 407, the fourth business 408, and the fifth business 409 are depicted as investments connectors.

Figure 9A:
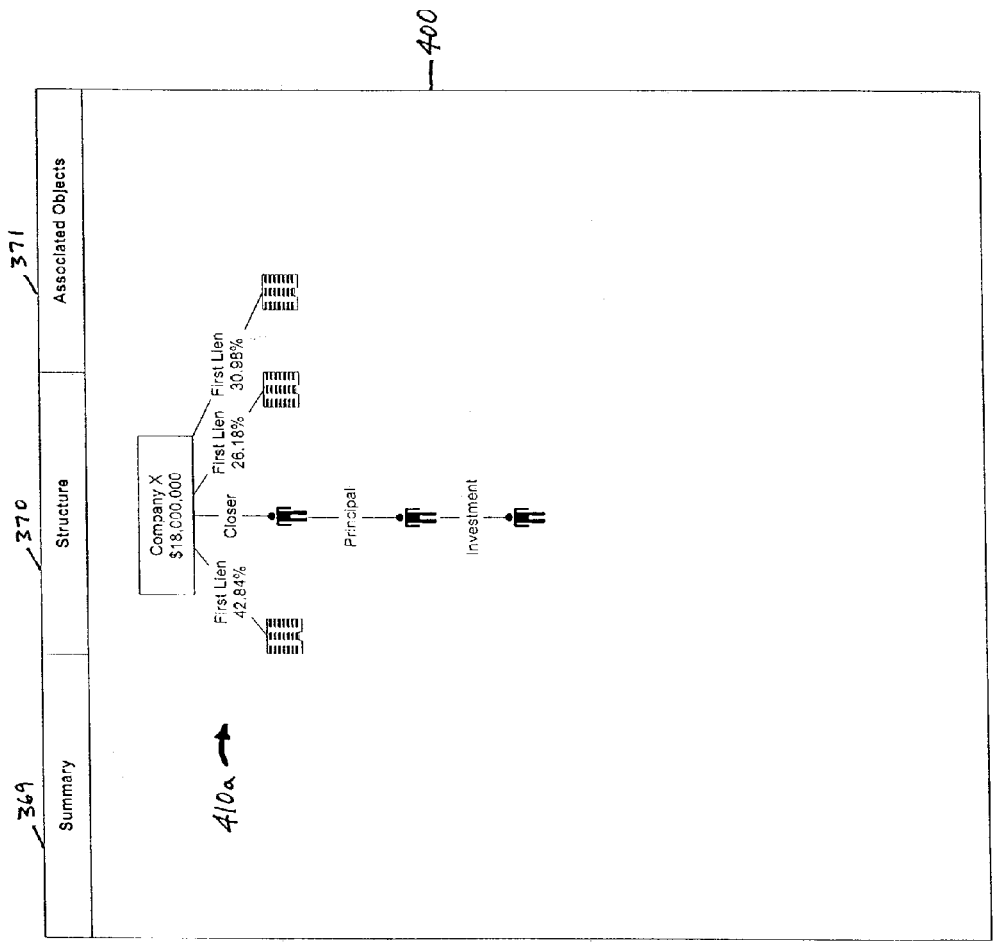
FIGS. 9A-9C illustrate one embodiment of a set of user interface for displaying various levels of an ownership structure according to the present invention.

Referring to FIG. 9A, an embodiment of the Structure page 400 includes a visual representation 410*a* depicting a relationship between entities involved in the commercial deal. In this embodiment, the visual representation 410*a* includes a level one ownership (asset) structure depicting relationships among related entities.

Figure 9B:
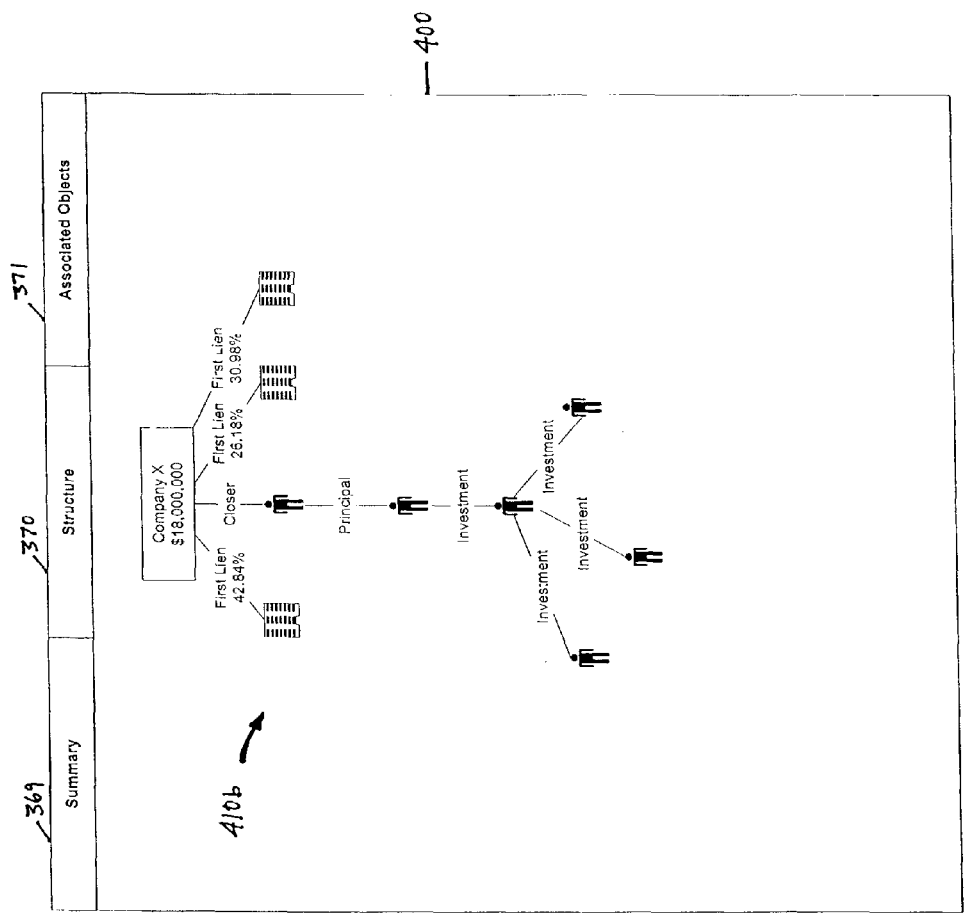

Referring to FIG. 9B, an embodiment of the Structure page 400 includes a visual representation 410*b* depicting a relationship between entities involved in the commercial deal. In this embodiment, the visual representation 410*b* includes a level two ownership (asset) structure depicting relationships among related entities. The visual representation 410*b* includes entities in addition to those entities shown in the visual representation 410*a*.

Figure 9C:
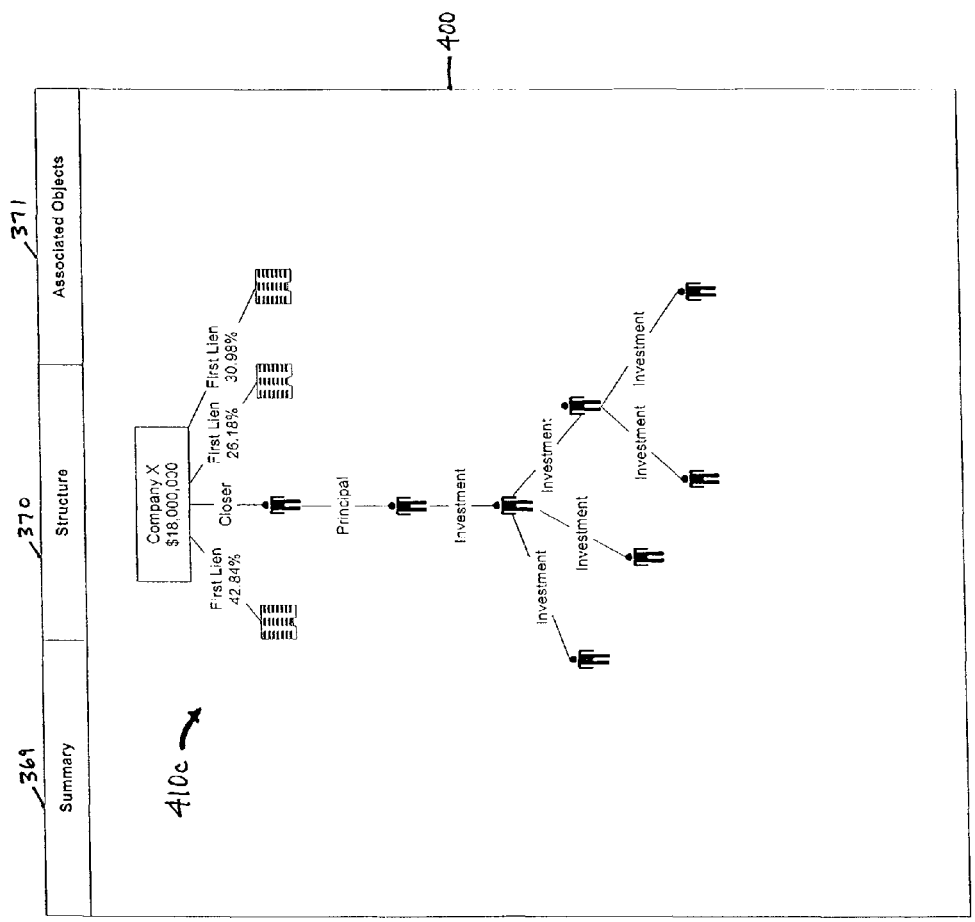

Referring to FIG. 9C, an embodiment of the Structure page 400 includes a visual representation 410*c* depicting a relationship between entities involved in the commercial deal. In this embodiment, the visual representation 410*c* includes a level three ownership (asset) structure depicting relationships among related entities. The visual representation 410*c* includes entities in addition to those entities shown in the visual representation 410*b*.

Figure 10:
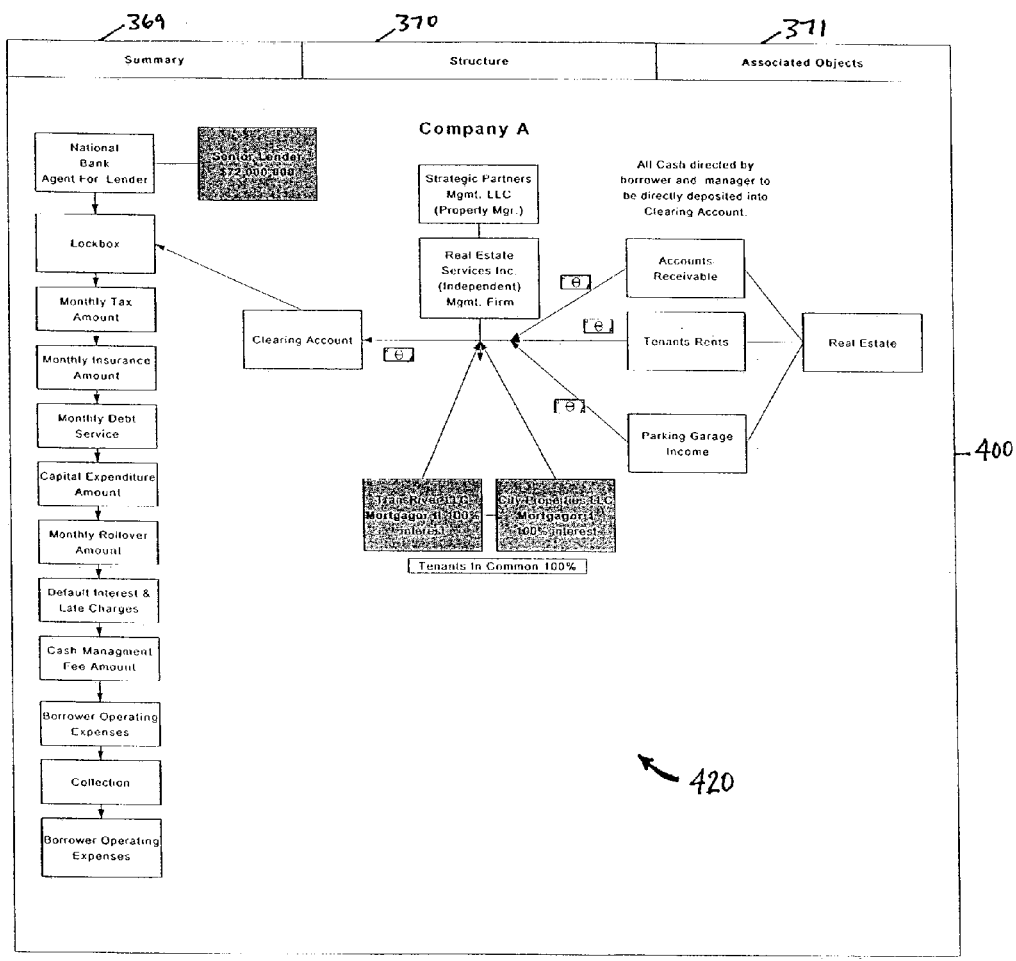
FIG. 10 illustrates one embodiment of a user interface for displaying a visual representation including a cash flow structure according to the present invention.

Referring to FIG. 10, an embodiment of the Structure page 400 includes a visual representation 420 depicting a relationship between entities involved in the commercial deal. In this embodiment, the visual representation 420 includes a cash flow structure depicting relationships among related entities. As shown, the visual representation 420 depicts cashflows from loan assets and property through various accounts (e.g., bank accounts, lockboxes, etc.).

Figure 11:
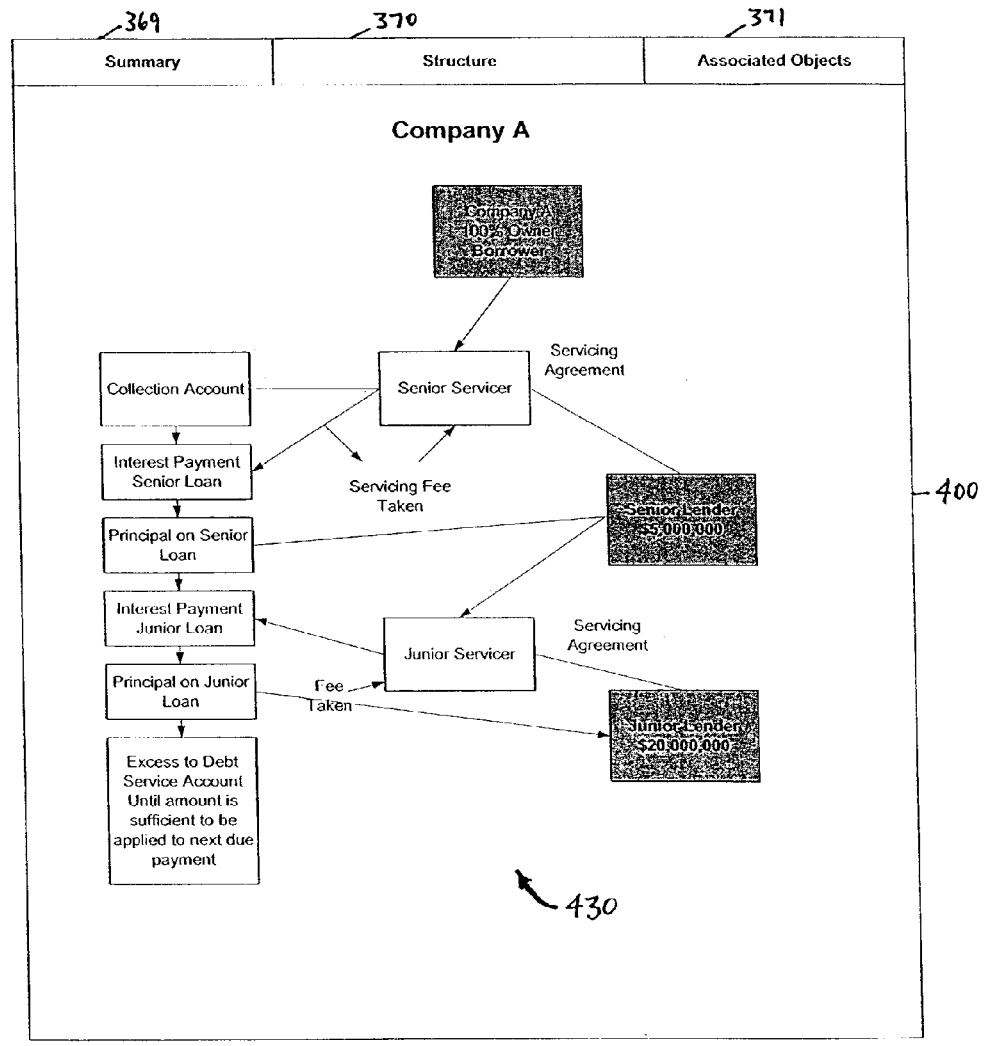
FIG. 11 illustrates one embodiment of a user interface for displaying a visual representation including a servicing agreement structure according to the present invention.

Referring to FIG. 11, an embodiment of the Structure page 400 includes a visual representation 430 depicting a relationship between entities involved in the commercial deal. In this embodiment, the visual representation 410*a* includes a servicing agreement structure depicting relationships among related entities. As shown, the visual representation 430 depicts the servicing agreements between the borrower and third-party servicers.

As described and illustrated, aspects of the present invention allow a user to efficiently create ownership structures, cash flow structure, and/or serving agreement structures related to a commercial deal. Using this technology, information underlying the ownership structure and entity relationships is input and incorporated to provide a user with a graphical representation of the commercial deal. The graphical representation may depict connections among entities (e.g., collateral to borrower, owner to property, property to property manager, etc.) illustrating the overall deal structure. Accordingly, a user may gain a better understanding of the ownership structure and cash flow as well as the servicing relationship or potential relationship should a loan be securitized, for example. This allows not only for enhanced data validation of the complex ownership and loan structures of a commercial deal, but also allows for a fluid and dynamic visual representation of flat data. Additionally, because the visual representation is generated automatically, the need for peripheral programs is eliminated.

A number of implementations have been described. Nevertheless, it will be understood that various modifications may be made and that other implementations are within the scope of the following claims.

What is claimed is:

1. A computer-implemented method for graphically representing a commercial deal, the method comprising the steps of:
   receiving a first entity definition from a user through a graphical user interface associated with a computing system, wherein the first entity definition is associated with at least one first entity;
   receiving a second entity definition from the user through the graphical user interface, wherein the second entity definition is associated with at least one second entity;
   receiving role information from the user through the graphical user interface for the at least one first entity and the at least one second entity, wherein the role information comprises role relationship information and assignment information, wherein the role relationship information comprises a role assumed by the at least one first entity and the at least one second entity, the identity of the at least one first entity and the at least one second entity as related to the at least one first entity, and an exposure of the at least one first entity or the at least one second entity, and wherein the assignment information comprises an associated type of role for each of the at least one first entity and the at least one second entity and a timing of the associated type of role assumed by each of the at least one first entity and the at least one second entity;
   receiving commercial deal information corresponding to the at least one first entity and the at least one second entity from the user through the graphical user interface;
   defining graphical objects for the at least one first entity and the at least one second entity, wherein the graphical objects comprise one or more of a shape, an image, a picture, a photograph, and a graphic, and wherein defining the graphical objects comprises the computing system automatically associating a graphical object with an entity based on the received first entity definition, the received second entity definition, the role information, and the received commercial deal information;
   automatically generating by the computing system an electronic visual representation on a display of the computing system depicting with the graphical objects relationships among the at least one first entity and the at least one second entity involved in the commercial deal corresponding to the received commercial deal information including relationships among the at least one first entity and the at least one second entity and an overall deal structure, wherein generating the electronic visual representation comprises the computing system automatically making connections between the graphical objects to visually convey the relationship between the at least one first entity and the at least one second entity on the display, and wherein the electronic visual representation of the entities is selectably rendered in at least one mode on the display corresponding to ownership structures, cash flow structures, and servicing relationship structures, wherein selecting the at least one mode facilitates specifying a level of the overall deal structure to be viewed via the electronic visual representation; and storing the electronic visual representation in a non-transitory computer readable medium in electronic communication with the computing system;

wherein the graphical user interface is configured to display a default electronic visual representation, wherein the default electronic visual representation is programmed to enable the user to manipulate the default electronic visual representation so that the overall deal structure that best fits parameters of the commercial deal is displayed; and wherein the graphical user interface is configured to enable the user to save the electronic visual representation as a part of the commercial deal information.

2. The method of claim 1, wherein the received commercial deal information comprises one or more loan transactions.

3. The method of claim 1, wherein each of the at least one first entity and the at least one second entity comprise one or more of an asset, a business, an individual, a property, collateral, and an account.

4. The method of claim 1, wherein the first entity definition comprises entity information describing specific attributes of the at least one first entity.

5. The method of claim 1, wherein the first entity definition comprises one or more of entity type, tax identification number, name, telephone number, facsimile number, address, website address, and parent company relationship.

6. The method of claim 1, wherein the role assumed by the at least one first entity and the at least one second entity comprise one or more of borrower, shareholder, investment, property manager, underwriter, principal, closer, employer, and employee.

7. The method of claim 1, wherein receiving role information from the user comprises receiving role information associated with a selected entity.

8. The method of claim 1, wherein the received commercial deal information comprises servicing agreement information and wherein the servicing agreement information includes details of conditions and services provided among the at least one first entity and the at least one second entity.

9. The method of claim 1, further comprising continuously updating the commercial deal information over a lifetime of the commercial deal.

10. The method of claim 9, further comprising automatically updating the electronic visual representation as the commercial deal information changes over a predetermined period of time.

11. The method of claim 1, wherein the received commercial deal information comprises cash management agreement information, and wherein the cash management agreement information comprises details of property and deal level cash flow streams and waterfall requirements among the at least one first entity and the at least one second entity.

12. The method of claim 1, further comprising rendering the electronic visual representation to the user as a structure of the graphical objects joined by connectors.

13. The method of claim 12, wherein the structure is rendered in multiple levels.

14. The method of claim 13, wherein increasing the multiple levels increases the number of graphical objects displayed in the electronic visual representation.

15. A communications system comprising:

a host system in communication with one or more client systems, the host system including a loan production system configured to:

define entities through a graphical user interface associated with a computing system;

assign roles for relating entities according to role information;

access commercial deal information corresponding to the entities;

define a first graphical object for a first group of related entities, wherein the first graphical object is selected from the group consisting of a shape, an image, a picture, a photograph, and a graphic, and wherein defining the first graphical object comprises the computing system automatically associating the first graphical object with the first group of related entities based on entity information, role information, and commercial deal information;

define a second graphical object for a second group of related entities, wherein the second graphical object is selected from the group consisting of a shape, an image, a picture, a photograph, and a graphic, and wherein defining the second graphical object comprises the computing system automatically associating the second graphical object with the second group of related entities based on entity information, role information, and commercial deal information, and wherein the first graphical object is different from the second graphical object; and automatically generate by the computing system an electronic visual representation depicting with the first graphical object and the second graphical object a relationship among entities involved in a commercial deal corresponding to the commercial deal information including relationships among related entities and an overall deal structure, wherein generating the electronic visual representation comprises the computing system automatically making connections between the graphical objects to convey the relationship between entities on the display based on the entity information, the role information, and the commercial deal information, wherein the electronic visual representation of the objects is selectably rendered in at least one mode corresponding to ownership structures, cash flow structures, and servicing relationship structures, wherein selecting the at least one mode facilitates specifying a level of the overall deal structure to be viewed via the electronic visual representation; and automatically update the electronic visual representation based on the commercial deal information over a lifetime of the commercial deal;

display a default electronic visual representation, wherein the default electronic visual representation is programmed to enable a user to manipulate the default electronic visual representation so that the overall deal structure that best fits parameters of the commercial deal is displayed; and wherein the graphical user interface is configured to enable the user to save the electronic visual representation as a part of the commercial deal information.

16. A non-transitory computer-readable medium containing computer-executable instructions embedded therein, the instructions, when executed, causing an electronic computer to:

receive a first entity definition from a user, wherein the first entity definition is associated with at least one first entity;

receive a second entity definition from the user, wherein the second entity definition is associated with at least one second entity;

receive role information from the user for the at least one first entity and the at least one second entity, wherein the role information comprises role relationship information and assignment information, wherein the role relationship information comprises a role assumed by the at least one first entity and the at least one second entity, the identity of the at least one first entity and the at least one second entity as related to the at least one first entity, and an exposure of the at least one first entity or the at least one second entity, and wherein the assignment information comprises an associated type of role for each of the at least one first entity and the at least one second entity and a timing of the associated type of role assumed by each of the at least one first entity and the at least one second entity;

access commercial deal information corresponding to the at least one first entity and the at least one second entity;

receive a user-defined graphical object for each of the related entities, wherein the graphical objects comprise one or more of a shape, an image, a picture, a photograph, and a graphic; and automatically generate an electronic visual representation depicting with the graphical objects relationships among entities involved in a commercial deal including relationships among related entities and an overall deal structure based on entity information, role information, and the commercial deal information, wherein generating the electronic visual representation comprises automatically making connections between the graphical objects to convey the relationship between entities, wherein the electronic visual representation is capable of being rendered in at least one mode corresponding to ownership structures, cash flow structures, and servicing relationship structures, wherein selecting the at least one mode facilitates specifying a level of the overall deal structure to be viewed via the electronic visual representation;

display a default electronic visual representation, wherein the default electronic visual representation is programmed to enable the user to manipulate the default electronic visual representation so that the overall deal structure that best fits parameters of the commercial deal is displayed; and save the electronic visual representation as a part of the commercial deal information.

17. A computer-implemented method for graphically representing a commercial deal, the method comprising the steps of:

defining entities through a graphical user interface associated with a computing system, wherein the entities are selected from a group consisting of an asset, a business, an individual, a property, collateral, and an account;

assigning roles for relating each of the defined entities, wherein the roles are selected from a group consisting of borrower, shareholder, investment, property manager, underwriter, principal, closer, employer, and employee;

accessing commercial deal information corresponding to the defined entities, wherein the commercial deal information is selected from a group consisting of transactions, servicing agreements, and cash management agreements;

defining graphical objects for related entities, wherein the graphical objects are selected from a group consisting of a shape, an image, a picture, a photograph, and a graphic, and wherein defining the graphical objects comprises the computing system automatically associating an object with an entity based on entity information, role information, and commercial deal information; and automatically generating by a computing system an electronic visual representation on a display depicting with the graphical objects relationships among entities involved in a commercial deal including relationships among related entities and an overall deal structure based on entity information, role information, and commercial deal information, wherein generating the electronic visual representation comprises the computing system automatically making connections between the graphical objects to convey the relationship between entities, wherein the electronic visual representation of the objects is capable of being rendered in at least one mode corresponding to ownership structures, cash flow structures, and servicing relationship structures, wherein selecting the at least one mode facilitates specifying a level of the overall deal structure to be viewed via the electronic visual representation; and storing the electronic visual representation in a non-transitory computer readable medium in electronic communication with the computing system;

displaying a default electronic visual representation, wherein the default electronic visual representation is programmed to enable a user to manipulate the default electronic visual representation so that the overall deal structure that best fits parameters of the commercial deal is displayed; and wherein the graphical user interface is configured to enable the user to save the electronic visual representation as a part of the commercial deal information.

18. The method of claim 17, wherein defining entities comprises receiving entity information describing specific attributes of the entities, wherein the entity information is selected from the group consisting of entity type, tax identification number, name, telephone number, facsimile number, address, website address, and parent company relationship.

19. The method of claim 17, wherein assigning roles comprises receiving role information associated with a selected entity, wherein the role information is selected from the group consisting of a specific role assumed by the entity, a timing of each specific role, a role relationship information for associating the selected entity with one or more other entities, and an assignment information for assigning a selected entity to the commercial deal.

20. The method of claim 17, wherein the commercial deal information comprises one or more of loan information, property information, cash management agreement information, and servicing agreement information.

21. A computer-implemented method for graphically representing a commercial deal, the method comprising the steps of:

defining entities using a computing system, wherein the entities comprise one or more of an asset, a business, an individual, a property, collateral, and an account, and wherein defining entities comprises electronically receiving through a graphical user interface associated with the computing system entity information describing specific attributes of the entities, wherein the entity information comprises one or more of entity type, tax identification number, name, telephone number, facsimile number, address, website address, and parent company relationship;

assigning roles for relating defined entities, wherein the roles comprise one or more of borrower, shareholder, investment, property manager, underwriter, principal, closer, employer, and employee, and wherein assigning roles comprises receiving role information associated with a selected entity, wherein the role information comprises one or more of a specific role assumed by the entity, a timing of the specific role, role relationship information for associating the selected entity with one or more other entities, and assignment information for assigning the selected entity to the commercial deal;

accessing commercial deal information corresponding to the defined entities, wherein the commercial deal comprises one or more loan transactions, servicing agreements, and cash management agreements;

defining graphical objects for related entities, wherein the graphical objects comprise one or more of a shape, an image, a picture, a photograph, and a graphic, and wherein defining the graphical objects comprises the computing system automatically associating an object with an entity based on entity information, role information, and commercial deal information, wherein the graphical objects are stored in a non-transitory computer readable medium; and automatically generating by the computing system an electronic visual representation on a display associated with the computing system, the electronic visual display depicting with the graphical objects relationships among entities involved in a commercial deal including relationships among related entities and an overall deal structure; and wherein automatically generating the electronic visual representation comprises the computing system automatically making graphical connections between the graphical objects to convey the relationship between the entities based on entity information, role information, and commercial deal information; and wherein the electronic visual representation of the objects is capable of being rendered in at least one mode corresponding to ownership structures, cash flow structures, and servicing relationship structures, wherein selecting the at least one mode facilitates specifying a level of the overall deal structure to be viewed via the electronic visual representation, and wherein the electronic visual representation comprises a first graphical object representative of a first individual and a second graphical object representative of a first collateral;

wherein the graphical user interface is configured to display a default electronic visual representation, wherein the default electronic visual representation is programmed to enable a user to manipulate the default electronic visual representation so that the overall deal structure that best fits parameters of the commercial deal is displayed; and wherein the graphical user interface is configured to enable the user to save the electronic visual representation as a part of the commercial deal information.

\* \* \* \* \*